United States Patent [19]

Yuasa et al.

[11] Patent Number: 5,069,533

[45] Date of Patent: Dec. 3, 1991

[54] METHOD OF ORIENTING LIQUID CRYSTAL OPTICAL DEVICE

[75] Inventors: Kimihiro Yuasa; Kenji Hashimoto; Tetsuo Fujimoto, all of Sodegaura, Japan

[73] Assignee: Idemitsu Kosan Co., Ltd., Tokyo, Japan

[21] Appl. No.: 370,324

[22] Filed: Jun. 22, 1989

[30] Foreign Application Priority Data

Jun. 29, 1988 [JP] Japan ............................ 63-159510
Aug. 24, 1988 [JP] Japan ............................ 63-208222
Jan. 18, 1989 [JP] Japan ............................ 63-007704
Mar. 9, 1989 [JP] Japan ............................ 63-055224

[51] Int. Cl.⁵ ........................................ G02F 1/13
[52] U.S. Cl. .................................... 359/76; 428/1; 156/229; 156/324; 359/104
[58] Field of Search ............ 350/334, 340, 341, 350 S, 350/339 R; 156/153, 154, 229, 324; 264/22, 24, 108; 428/1

[56] References Cited

U.S. PATENT DOCUMENTS

| | | | |
|---|---|---|---|
| 3,459,839 | 8/1959 | Hutfles | 350/341 |
| 4,182,700 | 1/1980 | Benton et al. | 428/1 |
| 4,521,265 | 6/1985 | Kunihiko et al. | 156/229 |
| 4,597,818 | 7/1986 | Aoyama et al. | 156/324 |
| 4,652,322 | 3/1987 | Lim | 156/229 |
| 4,668,448 | 5/1987 | Weber et al. | 264/22 |
| 4,897,290 | 1/1990 | Terasaka et al. | 350/340 |
| 4,904,065 | 2/1990 | Yuasa et al. | 350/350 S |
| 4,973,373 | 11/1990 | Hashimoto et al. | 350/339 R |

FOREIGN PATENT DOCUMENTS

| | | | |
|---|---|---|---|
| 54-126559 | 10/1979 | Japan | 350/334 |
| 55-38566 | 3/1980 | Japan | 350/341 |
| 55-96923 | 7/1980 | Japan | 350/341 |
| 57-66419 | 4/1982 | Japan | 350/341 |
| 61-198219 | 9/1986 | Japan | 350/350 S |

OTHER PUBLICATIONS

Patent Abstracts of Japan, vol. 12, No. 151, 62-267720, Naemura, "Manufacture of Liquid Crystal Element".
Patent Abstracts of Japan, vol. 12, No. 95, 62-227122, Ueno, "Method for Orientating High Polymer Liquid Crystal".
Patent Abstracts of Japan, vol. 12, No. 358, 63-109419, Ramimura, "Liquid Crystal Panel".

*Primary Examiner*—Rolf Hille
*Assistant Examiner*—Minhloan Tran
*Attorney, Agent, or Firm*—Antonelli, Terry, Stout & Kraus

[57] ABSTRACT

A method of orienting a liquid crystal optical device including
 a smectic liquid crystal and
 two flexible substrates which
  support the smectic liquid crystal layer between them and
  carry on their surfaces facing each other their respective electrode layers,
which method comprises orienting the smectic liquid crystal by subjecting the liquid crystal optical device to a bending treatment.

20 Claims, 16 Drawing Sheets

METHOD OF ORIENTING LIQUID CRYSTAL OPTICAL DEVICE

BACKGROUND OF THE INVENTION (a) Industrial Field of the Invention

The present invention relates to a method of orienting a liquid crystal optical device and to an apparatus usable for the method. Particularly, the present invention relates to a method of orienting a liquid crystal optical device which can be advantageously employed as a practical method of orienting a liquid crystal material in the production of a liquid crystal optical device whereby providing a liquid crystal optical device comprising a highly oriented smectic liquid crystal and being suitable as a liquid crystal display device, a liquid crystal memory device or the like. Further, the present invention relates to an apparatus which can be suitably used for the method of orienting a liquid crystal optical device.

(b) Description of the Related Art

In recent years, liquid crystal optical devices produced by employing a ferroelectric liquid crystal among smectic liquid crystals as a liquid crystal material, precisely controlling the orientation of the ferroelectric liquid crystal, and supporting the liquid crystal material between two substrates carrying their respective electrode layers have been attracting interest because of their excellent qualities, for example, high-speed response to external factors, such as an electric field, and high contrast ratio, and accordingly, their use for liquid crystal display devices, liquid crystal memory devices, etc. has extensively increased.

In order to attain such excellent qualities, it is necessary to control the orientation of the liquid crystal material, i.e. the ferroelectric liquid crystal, to a high degree, and therefore, there have been proposed various methods of controlling the orientation.

For example, when a low molecular weight ferroelectric liquid crystal is used as the ferroelectric liquid crystal, the orientation control has been conducted by using a rubbing technique, a shearing technique, a temperature gradient technique, a sio oblique evaporation technique or the like.

However, the orientation control using these techniques has deficiencies such as complicated pretreatment of substrates and complicated control operations. Further, the usual use of glass substrates causes problems such as difficulty in continuous production because of the troublesome conveyance process, difficulty in enlargement of area, etc.

In the conventional rubbing technique, the orientation of liquid crystal molecules is induced by an orientation layer, such as a polyimide or polyvinylalcohol, which has been oriented by a rubbing treatment after having been provided on the surface of a glass substrate for supporting liquid crystal, and in order to improve the conventional rubbing technique, there have been proposed some orientation control methods, for example, (1) in Japanese Patent Application Laid-open No. 63-14,125, is disclosed a method of orientation in which a liquid crystal is oriented on a rotating drum previously provided on its surface with an orientation layer and then, the oriented liquid crystal is transferred on a substrate to produce a liquid crystal optical device;

(2) in Japanese Patent Application Laid-open No. 63-64,027, is disclosed a method of orientation in which while, in the conventional rubbing technique, the orientation of liquid crystal is induced by an orientation layer, such as a polyimide or polyvinylalcohol, oriented by a rubbing treatment using a flocked fabric which causes the generation of a large amount of dust and scores in the orientation layer and also creates difficulty in the production of very thin cells, the orientation of an orientation layer (a polyimide, etc.) is conducted by pressing or rubbing the layer using a material having a hardness equal to or harder than that of the orientation layer, to prevent the generation of dust and maintain the rubbed surface smooth; and (3) in Japanese Patent Application Laid-open No. 63-66,534, is disclosed an orientation method wherein rubbing treatment is conducted during shifting the relative positions of the rubbing material and the substrate in a direction intersecting perpendicularly to the rubbing direction, to prolong the exchange cycle of the rubbing material and attain a uniform rubbing in a large area.

The above method (1), however, has problems in that (a) in order to apply the liquid crystal uniformly on a drum, it is required to control the viscosity of the liquid crystal by properly adjusting the temperature of the liquid crystal;

(b) waiting time is required for cooling the liquid crystal because the liquid crystal should be oriented in the course from its application on the drum to its transfer to the substrate; and (c) complicated optimization of every condition, for example, the kind of the polymer to be applied, the shape of the groove in the drum, and so on, is required because the orientation state of the liquid crystal widely varies depending on the conditions.

The above method (2) has problems in that (a) there is required a production process no less complicated than the usual production process employing the usual rubbing technique;

(b) it is difficult to attain uniform orientation over a large area;

(c) when a flexible substrate, such as a plastic substrate, is used, there is a possibility of damage of the slender electrode caused by the deformation of the substrate during pressing; and (d) in common with the usual rubbing technique, this method also needs steps of vacuum injection and slow cooling of liquid crystal, which make it difficult to reduce the producing time.

Further, the above method (3) also has problems in that (a) the method requires such a complicated process that a high production cost is inevitable;

(b) very accurate table and rubbing roll are required for orientation in a large area; and (c) the producing time is no shorter than the usual rubbing technique.

On the other hand, relating to the apparatus for orienting liquid crystal optical device to be used in the step of orienting liquid crystal material, various apparatuses have been proposed depending on orientation methods including those described above. As apparent from the problems described above, each of those apparatuses have deficiencies that continuous production is difficult, and that it is difficult to attain efficiently a high degree of orientation because of the necessity for a complicated components or construction, and so on.

In addition, the conventional methods of orienting liquid crystal optical devices and the conventional orientation apparatuses used therefor have serious problems in that realization of continuous operation is difficult in both cases of cut sheet type and lengthy panel type of liquid crystal optical devices, and that only low productivity is expected.

SUMMARY OF THE INVENTION

An object of the present invention is to provide a practically advantageous method of orienting liquid crystal optical devices, which excels in that the method can realize very easy, high speed, and continuous production of a high quality of liquid crystal optical devices having excellent fundamental properties of liquid crystal devices, such as high contrast ratio and high speed of response to external factors including electrical field, and also having sufficient flexibility and easiness in enlargement of area, and which excels, as well, in that the method makes it possible to attain easily a high degree of orientation without subjecting substrates to any particular pretreatment for orientation control.

Another object of the present invention is to provide a method of orienting liquid crystal optical devices and an orientation apparatus therefor which can produce liquid crystal optical devices having a high contrast independent of the anisotropy of substrates.

Another object of the present invention is to provide a method of orienting liquid crystal optical devices and an orientation apparatus therefor which can use polarizing plates most efficiently, the polarizing plates being to be used as a component in liquid crystal optical devices.

Another object of the present invention is to provide a method of orienting liquid crystal optical devices and an orientation apparatus therefor which have practical advantages in that continuous operation, particularly, in orienting cut-sheet type and lengthy panel type of liquid crystal optical devices can be efficiently practiced. Further, due to its simple instrumental components and construction, the apparatus of the present invention can provide liquid crystal optical devices excelling in quantitative productivity and stability.

Another object of the present invention is to provide an apparatus for orienting liquid crystal optical devices which is simple in construction, makes it possible to orient liquid crystal optical devices in an efficient, continuous operation by subjecting a lengthy liquid crystal optical element alone to bending treatment, and enables steady and a high degree of orientation.

The inventors continued researches to achieve the above objects and found that, without particular pretreatment of substrates, highly oriented liquid crystal optical devices, such as liquid crystal display devices, having excellent high-speed responsibility and high contrast ratio can be easily obtained by an extremely simple procedure, i.e. by applying bending treatment to a liquid crystal optical device which comprises a smectic liquid crystal supported between two flexible substrates bearing electrodes, and that the procedure is particularly effective for liquid crystal optical devices produced by applying continuously and at a high speed a liquid crystal material consisting of a smectic liquid crystal, on a plastic substrate bearing electrode and subsequently, putting on the liquid crystal layer an opposite plastic substrate bearing electrode and then laminating at a high speed. On the basis of these important knowledge, the inventors consequently completed the present invention.

That is, the present invention provides a method of orienting a liquid crystal optical device including
   a smectic liquid crystal and
   two flexible substrates which
      support the smectic liquid crsytal layer between them and
      carry on their surfaces facing each other their respective electrode layers,
which method comprises orienting the smectic liquid crystal by subjecting the liquid crystal optical device to a bending treatment.

When using a polymerized liquid crystal as the smectic liquid crystal, producibility of liquid crystal into film is extremely improved and plastic substrates can be suitably used, whereby enlargement in area becomes easy and productivity is increased. Further, the use of a polymerized liquid crystal has advantage that a high degree of orientation can be attained by a simple procedure without using rubbing technique, temperature gradient technique, sio oblique evaporation technique, or the like, which require complicated pretreatment.

Further, the present invention provides a method of orienting a liquid crystal optical device including
   a smectic liquid crystal, and
   two flexible substrates which
      support the smectic liquid crystal layer between them, and
      carry on their surfaces facing each other their respective electrode layers,
which method comprises orienting the smectic liquid crystal by supporting the liquid crystal optical device with a supporting means consisting of at least one supporting sheet and subjecting the supporting means supporting the liquid crystal optical device to a bending treatment in the course of continuous move of the supporting means.

The present invention further provides an apparatus for orienting a liquid crystal optical device comprising
   two supporting belts for supporting a liquid crystal optical device between them,
   at least two heating rolls for heating the liquid crystal optical device supported between the two supporting belts,
   a driving means for driving the two supporting belts, and
   at least one support roll for supporting jointly with at least one of the heating rolls the liquid crystal optical device supported between the two supporting belts.

The present invention further provides an apparatus for orienting a liquid crystal optical device comprising
   a supply roll for supplying a lengthy liquid crystal optical device,
   at least one heating roll whose roll surface comes into contact with the supplied lengthy liquid crystal optical device in the course of the move of the lengthy liquid crystal optical device so that the lengthy liquid crystal optical device is heated and subjected to a bending treatment by the heating roll, and
   a winding roll for winding the lengthy liquid crystal optical device subjected to the bending treatment.

BRIEF DESCRIPTION OF THE DRAWINGS

FIG. 1 is a schematic view illustrating an example of a method of forming a smectic liquid crystal layer by an application method, which may be employed as the step previous to the orientation step according to the present invention and the supporting step by laminating or the like.

Each of FIG. 5, FIG. 6.

Each of FIG. 9

Each of FIG. 11, FIG. 13, FIG. 14.

Figures 12A, 12B, 12C:
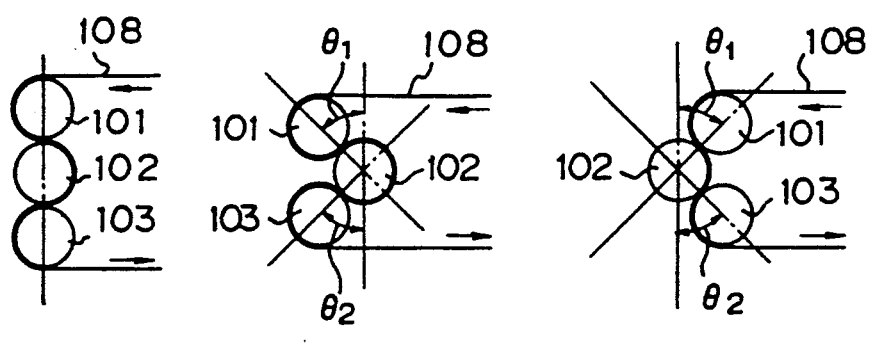

Each of FIGS. 12(a), (b), and (c) is an elevational view schematically illustrating the arrangement of heating rolls and the system of movement in the orientation method and orientation apparatus according to the present invention.

Figure 16:
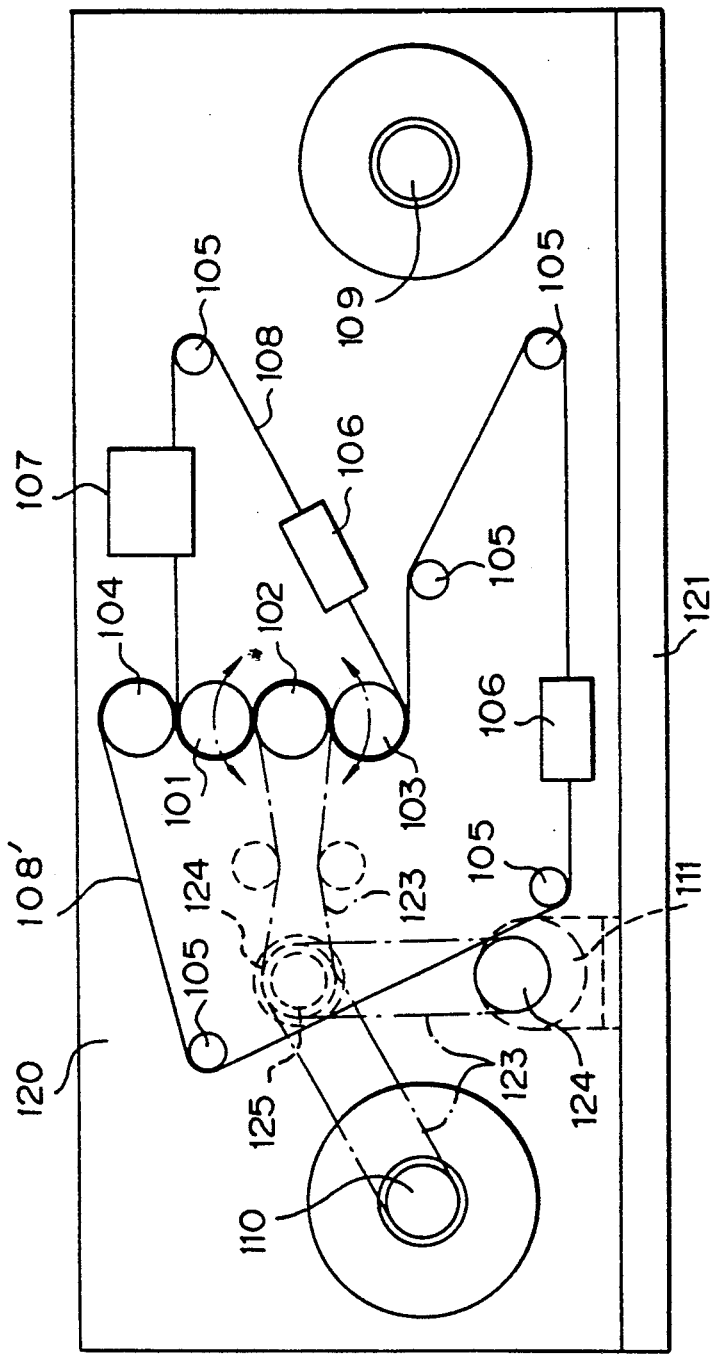

FIG. 16 is an elevational view schematically illustrating the whole construction of an embodiment of the orientation apparatus according to the present invention.

Figure 17:
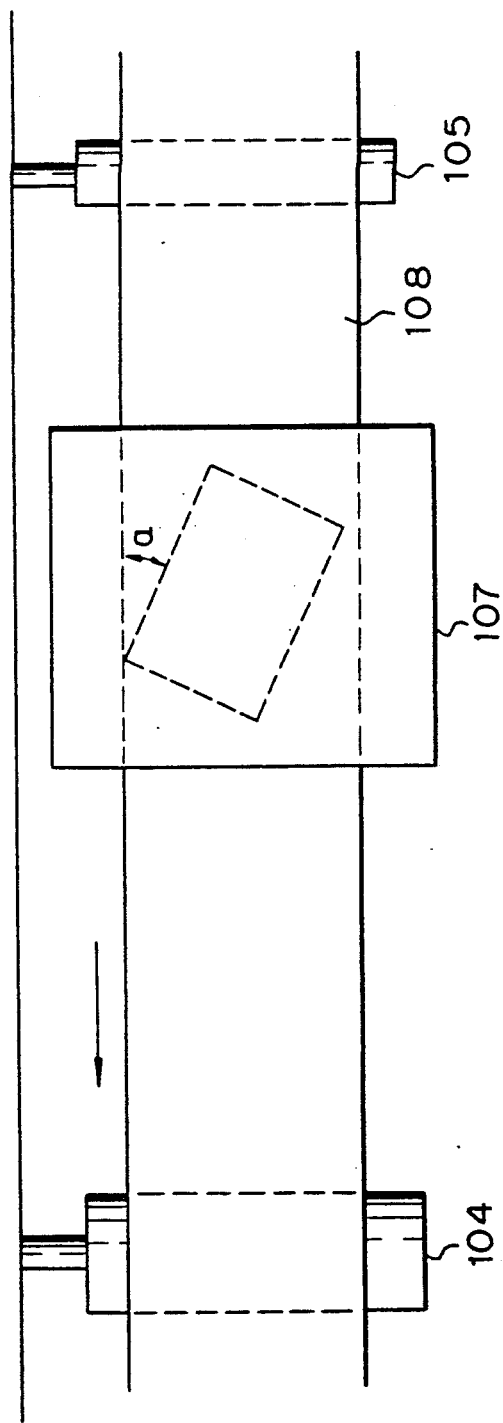

FIG. 17 is a plan view schematically illustrating the arrangement of supplied liquid crystal optical devices of a cut sheet type, the liquid crystal optical devices being arranged by an instrument for controlling panel angle so as to adjust the orientation direction, in the orientation method and orientation apparatus according to the present invention.

Figure 18:
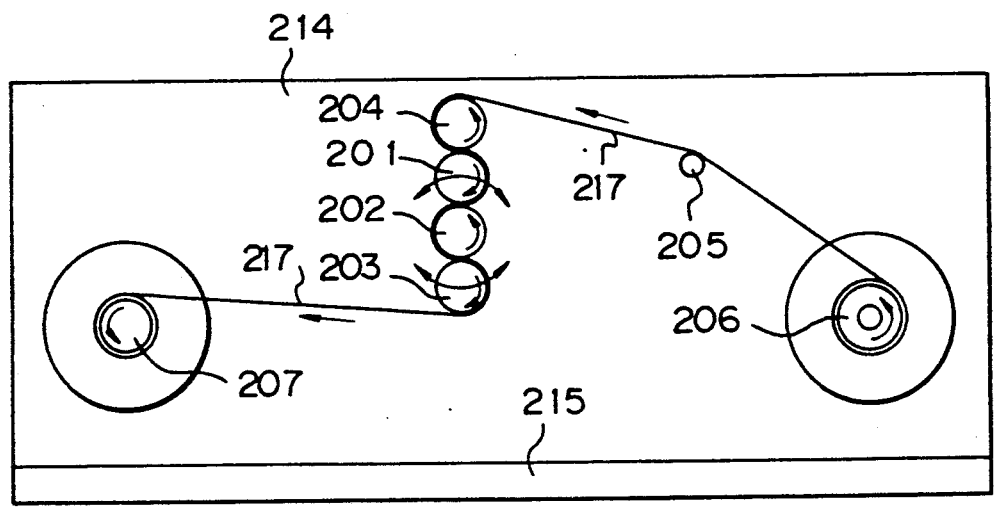
Figure 19:
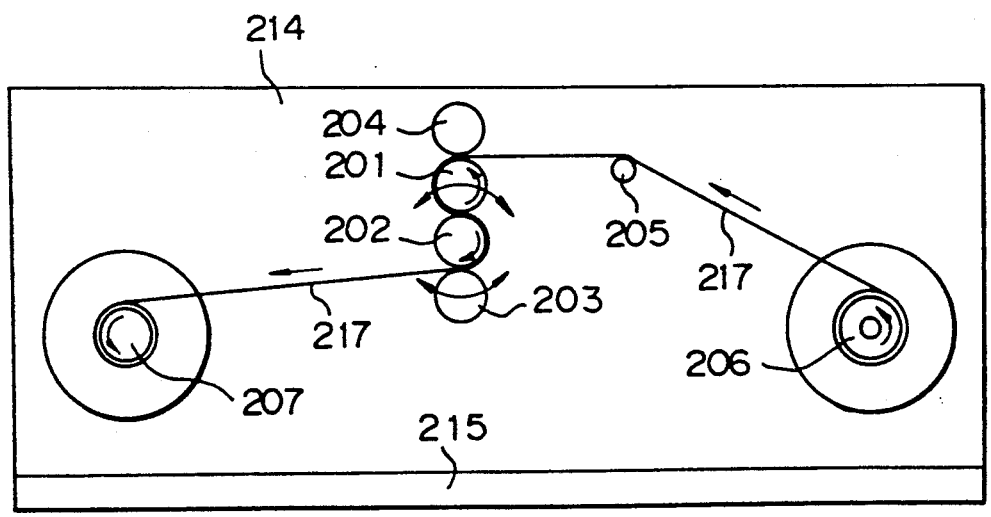

Each of FIG. 18 and FIG. 19 is an elevational view schematically illustrating an embodiment of the orientation apparatus according to the present invention.

Figure 20:
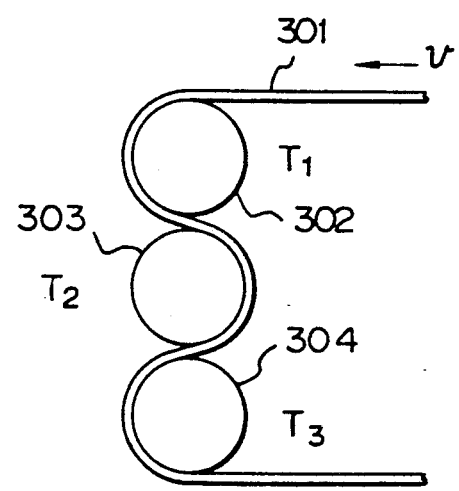
Figure 21:
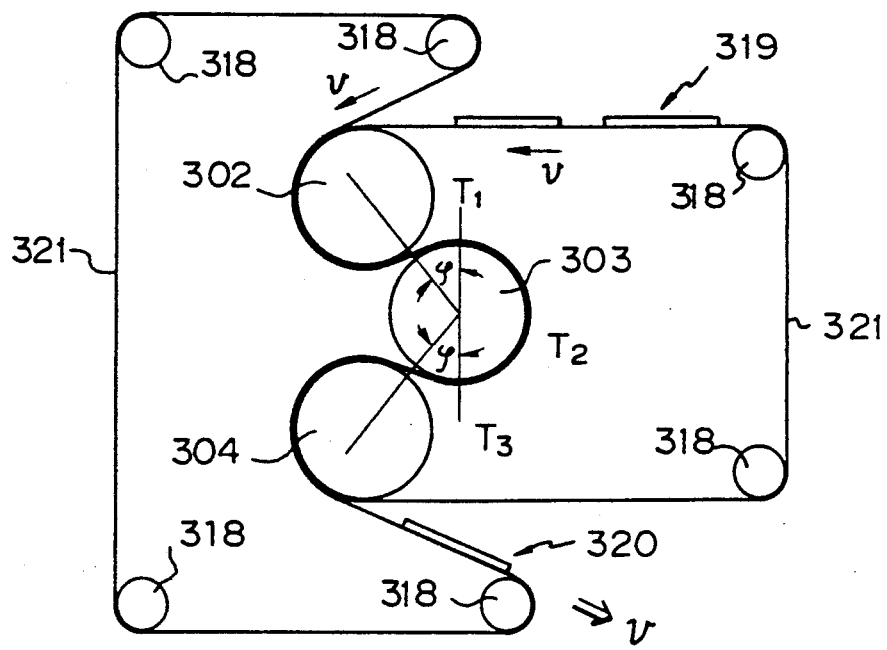

Each of FIG. 20 and FIG. 21 is a schematic view illustrating an embodiment of the orientation method and the apparatus therefor according to the present invention.

Figure 22:
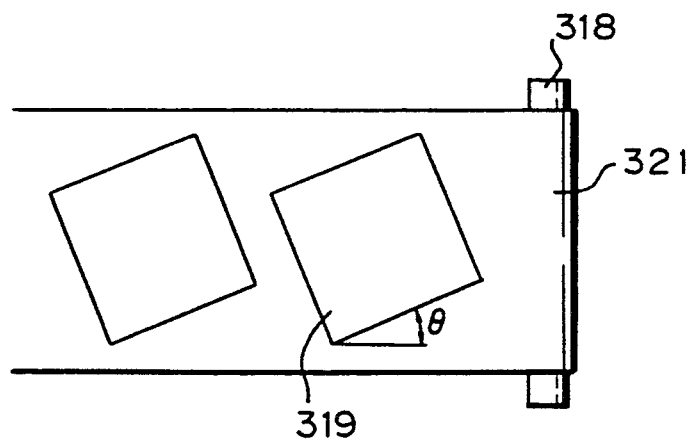

FIG. 22 is a plan view illustrating the arrangement of the liquid crystalline optical devices yet to be oriented on the support belt shown in FIG. 21.

Figure 23:
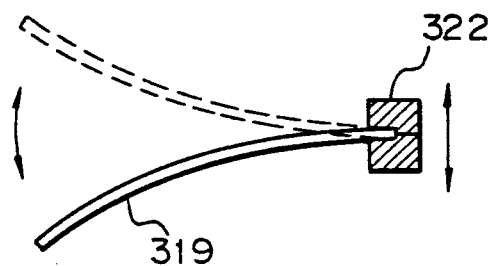
Figure 24:
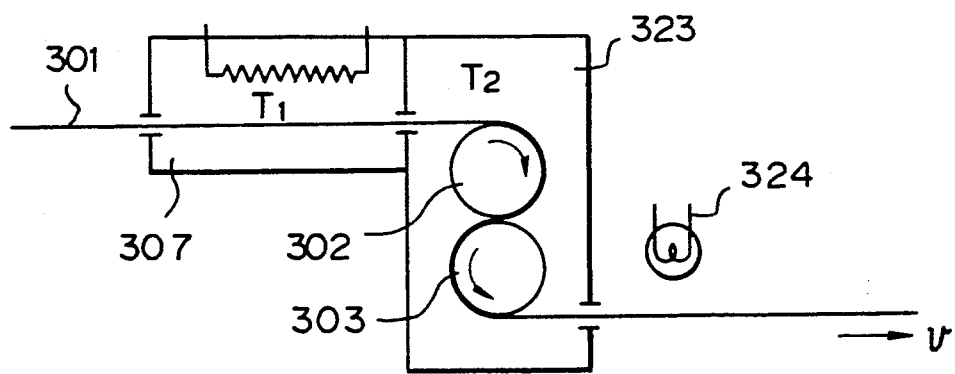

Each of FIG. 23 and FIG. 24 is a schematic view illustrating an embodiment of the orientation method and the apparatus therefor according to the present invention.

DESCRIPTION OF THE PREFERRED EMBODIMENTS

The flexible substrates to be used in the present invention may be of various kinds. From the standpoints of productivity, wide use, processability, etc., however, it is preferable to use those made of a plastic or the like, which excels in strength, heat resistance, transparency, and durability.

Some illustrative examples of the flexible plastic include crystalline polymers such as uniaxially oriented or biaxially oriented polyethyleneterephthalate, noncrystalline polymers such as polysulfones and polyethersulfones, polyolefins such as polyethylene and polypropylene, polyamides such as polycarbonates and nylons.

Among these, the particularly preferred are uniaxially oriented polyethyleneterephthalate, polyethersulfones, and polycarbonates.

In the present invention, the two substrates may be made of the same material, or each substrate may be made of a material different from that of the other. Generally, at least one of the two substrates is optically transparent and is provided with a transparent electrode layer.

There is no particular restriction in the form of the substrates to be used in the present invention, and the forms of the substrate to be used may vary depending on the purpose of use, etc. Generally, substrates of plate-form, sheet-form or film-form are preferably used in the present invention, and it is particularly preferable to use film-form substrates to take advantage of their fitness to continuous production system.

The thickness of the substrates may be selected according to the qualities of the substrates such as the degrees of transparency, flexibility, strength, and processability, the purpose of use of the produced devices, etc., and it is generally from about 20 to about 1000 μm.

The electrode structures to be used in the present invention may be of common kinds, for example, conductive inorganic films such as a metal film and a film of a conductive oxide, a conductive organic film or the like.

In the present invention, it is generally preferable to use a transparent or semitransparent electrode layer as at least one of the two electrode layers and to provide the transparent or semitransparent electrode layer to a transparent substrate.

Some illustrative examples of the transparent or semitransparent electrode layer include tin oxide film called NESA, indium oxide containing tin oxide, which is called ITO (Indium-Tin oxide), deposition layers of gold, titanium, etc., and thin layers of metals or alloys. These electrode layers may be provided to the prescribed surfaces of substrates or to the surface of liquid crystal layer by means of various techniques including known techniques, for example, spattering technique, evaporation technique, printing technique, application technique, gliding technique, and adhering technique.

There is no particular restriction in the form of the electrode layers to be used in the present invention, and they may cover the whole surfaces of the prescribed subjects such as the substrates, or may have a form of a stripe or any other form desired.

The smectic liquid crystal to be used in the present invention may be any liquid crystal exhibiting a smectic phase in its liquid crystal state. The preferred is a ferroelectric liquid crystal, and any ferroelectric liquid crystal may be used so long as it exhibits a ferroelectric liquid crystal phase.

Some examples of the liquid crystal exhibiting a ferroelectric liquid crystal phase include ferroelectric low molecular weight liquid crystals, ferroelectric polymer liquid crystals, and mixtures thereof.

Some examples of the ferroelectric low molecular weight liquid crystals include a liquid crystal consisting of one ferroelectric low molecular weight liquid crystal, a mixture of two or more ferroelectric low molecular weight liquid crystals, a mixture of one or more ferroelectric low molecular weight liquid crystals and one or more non-ferroelectric low molecular weight liquid crystals, and the like.

Some examples of the ferroelectric polymer liquid crystals include a liquid crystal consisting of one ferroelectric polymer liquid crystal, a mixture of two or more ferroelectric polymer liquid crystals, a mixture of one or more ferroelectric low molecular weight liquid crystals and one or more ferroelectric polymer liquid crystals, a mixture of one or more ferroelectric low molecular weight liquid crystals and one or more non-ferroelectric polymer liquid crystals, a mixture of one or more ferroelectric polymer liquid crystals and one or more non-ferroelectric low molecular weight liquid crystals, and the like.

That is, the ferroelectric polymer liquid crystals which may be used in the present invention include all types of polymer liquid crystals exhibiting ferroelectricity, for example, ferroelectric polymer liquid crystals of which the polymer molecules themselves exhibit ferroelectric properties of liquid crystals (including homopolymers, copolymers, and mixtures thereof); a mixture of one or more ferroelectric polymer liquid crystals and one or more non-ferroelectric polymer liquid crystals and/or one or more non-liquid-crystalline polymers; a mixture of one or more ferroelectric polymer liquid crystals and one or more ferroelectric low molecular weight liquid crystals; a mixture of one or more ferroelectric polymer liquid crystals and one or more ferroelectric low molecular weight liquid crystals and one or more non-ferroelectric polymer liquid crystals and/or one or more non-liquid-crystalline polymers; and a mixture thereof with one or more non-ferroelectric low molecular weight liquid crystals.

Among the ferroelectric polymer liquid crystals described above, the preferred examples are side-chain type ferroelectric polymer liquid crystals, and the particularly preferred are side-chain type ferroelectric polymer liquid crystals exhibiting chiral smectic C phase.

Some illustrative examples of the side-chain type ferroelectric polymer liquid crystals include the polymers and copolymers which have the repeating units represented by the following general formulas, and blends thereof.

[I] Polyacrylate-type ferroelectric polymer liquid crystals (These are disclosed in Japanese Patent Application Laid-open No. 63-99204 and No. 63-273608)

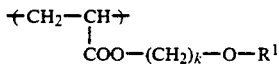

wherein
k is an integer having a value of 1 to 30,
$R^1$ is

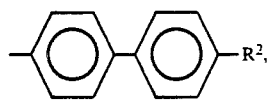

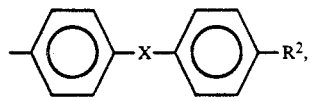

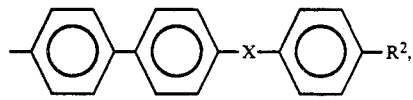

X is —COO— or —OCO—,
$R^2$ is —COOR$^3$, —OCOR$^3$, —OR$^3$ or —R$^3$,
wherein
$R^3$ is

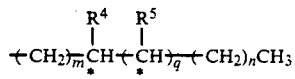

wherein
each of m and n is independently an integer having a value of 0 to 9,
q is an integer having a value of 0 or 1,
each of $R^4$ and $R^5$ is independently —CH$_3$, a halogen atom or —CN, with the proviso that when $R^5$ is —CH$_3$, n is not a value of 0,
C* represents an asymmetric carbon atom.

The number average molecular weights of the polymers are preferably 1,000 to 400,000. A number average molecular weight less than 1,000 may sometimes decrease the application formability into films and, on the other hand, a number average molecular weight of more than 400,000 may sometimes cause undesirable results such as a lengthened response time. The particularly preferred range of the number average molecular weight cannot be uniformly defined because it depends on the kind of R$^1$, the value of k, the optical purity of R$^3$, etc., but it is generally from 1,000 to 200,000.

The polymers may be generally obtained by polymerizing the monomers represented by the following general formula

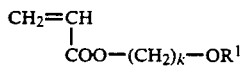

wherein k, R$^1$, R$^2$, R$^3$, R$^4$, R$^5$, m, and n are as defined above, using a known polymerization method.

Relating to the liquid crystals represented by the following formula, which are some examples of the polyacrylate-type ferroelectric polymer liquid crystals, the temperatures at which they exhibit chiral smectic C phase (T$_{sc}$*) and the average molecular weight (Mn) are shown below.

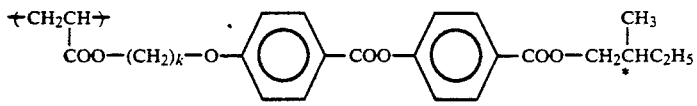

(a) k=12, Mn=5300, $T_{sc}$*: 5°–12° C.
(b) k=14, Mn=6500, $T_{sc}$*: 13°–31° C.

[II] Polyether-type ferroelectric polymer liquid crystals (These are disclosed in Japanese Patent Application Laid-open No. 63-264629)

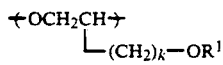

wherein k, $R^1$, $R^2$, $R^3$, $R^4$, $R^5$, m, n, and X are as defined above in [I].

The number average molecular weights of the polymers are preferably 1,000 to 400,000. A number average molecular weight less than 1,000 may sometimes decrease the application formability into films and, on the other hand, a number average molecular weight of more than 400,000 may sometimes cause undesirable results such as a lengthened response time. The particularly preferred range of the number average molecular weight cannot be uniformly defined because it depends on the kind of $R^1$, the value of k, the optical purity of $R^3$, etc., but it is generally from 1,000 to 200,000.

The polymers may be generally obtained by polymerizing the monomers represented by the following general formula

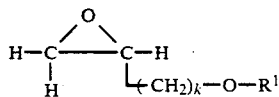

wherein k, $R^1$, $R^2$, $R^3$, $R^4$, $R^5$, m, n, and X are as defined above, using a known polymerization method.

Relating to the liquid crystals represented by the following formula, which are some examples of the polyether-type ferroelectric polymer liquid crystals, the temperatures at which they exhibit chiral smectic C phase ($T_{sc}$*) and the average molecular weight (Mn) are shown below.

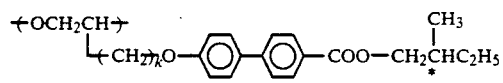

(a) k=8, Mn=2800, $T_{sc}$*: 24°–50° C.
(b) k=10, Mn=2400, $T_{sc}$*: 19°–50° C.

[III] Polysiloxane-type ferroelectric polymer liquid crystals (These are disclosed in Japanese Patent Application Laid-open No. 63-280742)

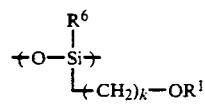

wherein $R^6$ is a lower alkyl radical, and k, $R^1$, $R^2$, $R^3$, $R^4$, $R^5$, m, n, and X are as defined above.

The number average molecular weights of the polymers are preferably 1,000 to 400,000. A number average molecular weight less than 1,000 may sometimes decrease the application formability into films and, on the other hand, a number average molecular weight of more than 400,000 may sometimes cause undesirable results such as a lowered speed of response to electric field. The particularly preferred range of the number average molecular weight cannot be uniformly defined because it depends on the kind of $R^1$, the values of k, m, and n, the optical purity of $R^3$, etc., but it is generally from 1,000 to 200,000.

The polymers may be generally obtained by reacting an alkylhydropolysiloxane represented by the following general formula

wherein $R^6$ is as defined above, with a liquid crystal unit compound represented by the following formula $H_2C=CH(CH_2)_{k-2}O-R^1$ wherein $R^1$, $R^2$, $R^3$, $R^4$, $R^5$, k, m, n, and X are as defined above, under a specified condition.

Relating to the liquid crystals represented by the following formula, which are some examples of the polysiloxane-type ferroelectric polymer liquid crystals, the temperatures at which they exhibit chiral smectic C phase ($T_{sc}$*) and the average molecular weight (Mn) are shown below.

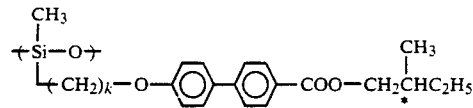

(a) k=6, Mn=16,400, $T_{sc}$*: 70°–90° C.
(b) k=8, Mn=15,000, $T_{sc}$*: 39°–91° C.

[IV] Polyester-type ferroelectric polymer liquid crystals (These are disclosed in Japanese Patent Application Laid-open No. 62-219225)

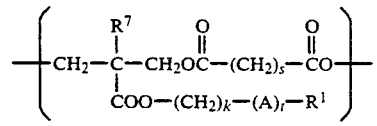

wherein
$R^7$ is —H, —$CH_3$ or —$C_2H_5$,
s is an integer having a value of 1 to 20,
A is —O— (oxygen) or —COO—,
t is an integer having a value of 0 or 1, and
$R^1$, $R^2$, $R^3$, $R^4$, $R^5$, k, m, and n are as defined above or

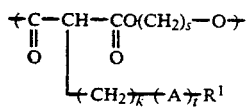

wherein s, A, t, $R^1$, $R^2$, $R^3$, $R^4$, $R^5$, k, m, and n are as defined above.

These polymers may be obtained by employing general methods for polycondensation of polyesters. That is, these polymers may be obtained by polycondensing a dibasic acid or an acid chloride therefrom with a dihydric alcohol corresponding to the above structures.

The number average molecular weights of the polymers are preferably 1,000 to 400,000. A number average molecular weight less than 1,000 may sometimes decrease the application formability into films and, on the other hand, a number average molecular weight of more than 400,000 may sometimes cause undesirable results such as a lowered speed of response to electric field. The particularly preferred range of the number average molecular weight cannot be uniformly defined because it depends on the kind of $R^2$, the value of k, the optical purity of $R^3$, etc., but it is generally from 1,000 to 200,000.

[V] Copolymers containing two or more of the repeating units of the above-described [I] polyacrylate type polymers, [II] polyether type polymers, [III] polysiloxane type polymers, and [IV] polyester type polymers Some illustrative examples of the copolymers comprising the repeating units of the above-described [I], [II], [III], and [IV] are shown below.

(1) Copolymers comprising the repeating unit of [I] and one or more repeating units represented by the following formulas

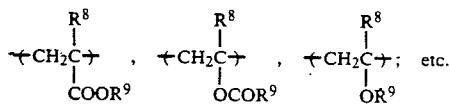

wherein
$R^8$ is —H, —$CH_3$ or —Cl and
$R^9$ is an alkyl or aryl of $C_{1-10}$.

The number average molecular weight of the copolymers are generally 1,000 to 400,000, preferably 1,000 to 200,000.

The content of the repeating unit of [I] is preferably 20 to 90%.

(2) copolymers obtained by copolymerizing a monomer represented by the following formula

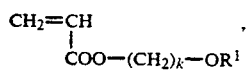

which is the precursor of the repeating unit of [I], with one or more monomer represented by the following formulas

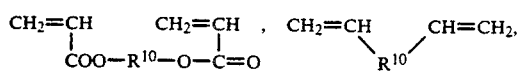

etc. wherein $R^{10}$ is an alkyl or aryl of $C_{1-20}$.

(3) Copolymers comprising the repeating unit of [I] and the repeating unit represented by the following formula

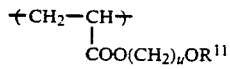

wherein
u is an integer having a value of 1 to 30,
$R^{11}$ is

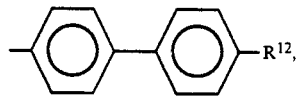

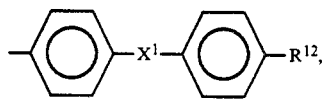

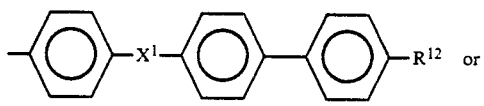

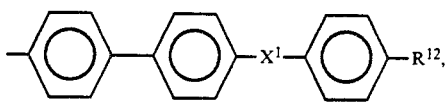

$X^1$ is —COO—, —OCO— or —CH=N—,
$R^{12}$ is —$COOR^{13}$, —$OCOR^{13}$, —$OR^{13}$ or —$R^{13}$, and
$R^{13}$ is an alkyl, fluoroalkyl or chloroalkyl of $C_{1-10}$.

The ferroelectric polymer liquid crystals which may be used in the present invention are not limited to those having one or two asymmetric carbon atoms in the end portion of each side chain, and those having three or more asymmetric carbon atoms in the end portion of each side chain also may be used.

Also, a mixture of one or more of the above-described ferroelectric polymer liquid crystals and one or more low molecular weight liquid crystals having chiral smectic C phase may be used.

The ferroelectric polymer liquid crystals further include, for example, a blend of one or more polymers each having a proton donor and/or a proton acceptor and one or more ferroelectric low molecular weight liquid crystals (These are disclosed in WO 088/00606).

Some examples of such ferroelectric polymer liquid crystals include those wherein one or more of the low molecular weight liquid crystals shown below and polyvinylacetate are bonded by hydrogen bond to form a polymeric state.

Some examples of the ferroelectric low molecular weight liquid crystals include the following compounds.

(1)

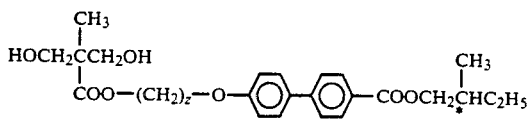

wherein z is an integer having a value of 3 to 30.

(2) 2-methylbutyl 4-[4'-{12-(2,2-dimethylolpropionyloxy)dodecyloxy}benzoyloxy]benzoate (3) 2-methylbutyl 4-[4'-{12-(2,2-diacetoxypropionyloxy)dodecyloxy}benzoyloxy]benzoate (4) 2-methylbutyl 4'-[12-(2,2-dimethylolpropionyloxy)dodecyloxy}biphenyl]-4-carboxylate (5) 2-methylbutyl 4'-[12-(2,2-diacetoxypropionyloxy)dodecyloxy]biphenyl-4-carboxylate (6) 2-methylbutyl 4'[4''-{12-(2,2-dimethylolpropionyloxy)dodecyloxy}benzoyloxy]biphenyl-4-carboxylate (7) 2-methylbutyl 4'-[4''-{12-(2,2-diacetoxypropionyloxy)dodecyloxy}benzoyloxy]biphenyl-4-carboxylate (8) 2-methylbutyl 4-[4''-{12-(2,2-dimethylolpropionyloxy)dodecyloxy}biphenyl-4'-carbonyloxy]-benzoate (9) 2-methylbutyl 4-[4''-{12-(2,2-diacetoxypropionyloxy)dodecyloxy}biphenyl-4'-carbonyloxy]benzoate Some examples of other type of ferroelectric polymer liquid crystals include a blend of a ferroelectric low molecular weight liquid crystal and a thermoplastic noncrystalline polymer (The blend are disclosed in Japanese Patent Application Laid-open No. 61-47427).

The above liquid crystal is a liquid crystal composition comprising 10 to 80% by weight of a thermoplastic noncrystalline polymer and 20 to 90% by weight of a low molecular weight liquid crystal. The liquid crystal composition is provided with an ability of self-form-retention by the addition of a prescribed amount of a specific noncrystalline polymer to a low molecular weight liquid crystal lacking the ability of self-form-retention, the addition of the noncrystalline polymer enabling to form the obtained liquid crystal composition into a film or the like.

The thermoplastic noncrystalline polymers to be used in the liquid crystal composition are those having no optical anisotropy, such as polystyrene and polycarbonates.

Some examples of the above-described low molecular weight liquid crystals include those shown below, which are ferroelectric liquid crystal compounds having chiral smectic C phase.

(1) DOBAMBC (p-decyloxybenzylidene-amino-2-methylbutyl cinnamate)

(2) 2-methylbutyl 4'-octyloxybiphenyl-4-carboxylate (3) 2-methylbutyl 4-(4''-octyloxybiphenyl-4'-carbonyloxy)benzoate (4) 4-(2-methylbutyloxy)phenyl 4-octyloxybenzoate (5) 3-methyl-2-chloropentyl 4'-octyloxybiphenyl-4-carboxylate (6) 4'-octyloxybiphenyl-4-yl 3-methyl-2-chloropentanoate (7) p-hexyloxybenzylidene-p'-amino-2-chloropropyl cinnamate (8) 4-(2-methylbutylbenzylidene)-4'-octylaniline In the present invention, the ferroelectric liquid crystal can be further mixed with thermoplastic resins other than those described above so far as the accomplishment of the object of the present invention would not be hindered. The preferred amount of the thermoplastic resins to be added is less than 60% by weight. The preferred thermoplastic resins have a Tg (glass transition temperature) of higher than 30° C., more preferably higher than 70° C.

Some illustrative examples of such thermoplastic resins include polymers or copolymers of a vinyl halide, for example, polyvinylchloride, polyvinyliodide, polyvinylfluoride, vinyl chloride-vinyl acetate copolymer, vinyl chloride-ethylene copolymer, vinyl chloride-propylene copolymer, vinyl chloride-vinylidene chloride copolymer, vinyl chloride-butadiene copolymer, vinyl chloride-acrylic ester copolymer, vinyl chloride-acrylonitrile copolymer, vinyl chloride-styrene-acrylonitrile terpolymer, vinyl chloride-vinylidene chloride-vinyl acetate copolymer, polyvinylidenechloride, polytetrafluoroethylene, polytetrafluorochloroethylene, and polyvinylidenefluoride;

polymers or copolymers of an unsaturated alcohol or an unsaturated ether, for example, polyvinylalcohol, polyallyalcohol, polyvinylether, and polyallylether;

polymers or copolymers of an unsaturated carboxylic acid such as acrylic acid or methacrylic acid;

polymers or copolymers of an ester compound having unsaturated bond in the part of alcohol remaining after esterification, for example, polyvinylesters, such as polyvinylacetate, and polyallylesters, such as polyphthalic acid;

polymers or copolymers of a compound having unsaturated bond in the part of acid remaining after esterification or in both the part of acid and the part of alcohol each remaining after esterification, for example, polyacrylic esters, polymethacrylic esters, polymaleic esters, and polyfumaric esters;

polymers or copolymers of an unsaturated nitrile, for example, polymer or copolymers of acrylonitrile, polymer or copolymers of methacrylonitrile, polyvinylidenecyanide, polymer or copolymers of malononitrile, and polymer or copolymers of fumaronitrile;

polymers or copolymers of an aromatic vinyl compound, for example, polystyrene, poly-α-methylstyrene, poly-p-methylstyrene, styrene-α-methylstyrene copolymer, styrene-p-methylstyrene copolymer, polyvinylbenzene, and polystyrene halide;

polymers or copolymers of a heterocyclic compound, for example, polyvinylpyridine, poly-N-vinylpyrolidine, and poly-N-vinylpyrolidone;

polyester condensation polymers, for example, polycarbonates, and polyamide condensation polymer, for example, nylon 6 and nylon 6,6;

polymers or copolymers containing one or more kinds of units selected from maleic anhydride unit, maleimide unit, and fumaric acid unit; and heat-resisting organic high molecular weight compounds, for example, polyamide-imides, polyetherimides, polyimides, polyphenyleneoxide, polyphenylenesulfide, polysulfone, polyethersulfons, and polyallylate.

The compatibility of the thermoplastic resin with the liquid crystal may be either large or small because the thermoplastic resin is to be used as a structural material.

In the present invention, the ferroelectric liquid crystal may be mixed with a resin able to be crosslinked, prior to use, according to demand. Some examples of the preferred resin able to be crosslinked include epoxy resins, unsaturated polyester resin, and silicone resins able to be crosslinked.

Herein, the resins able to be crosslinked include hardening agents for epoxy resins, such as amine and acid anhydrides, and hardening agents for unsaturated polyester resins, such as styrene. When a resin able to be crosslinked is used, the crosslinking treatment should be carried out after conclusion of bending treatment.

Some typical examples of the resin able to be crosslinked are shown below.

Epoxy resin

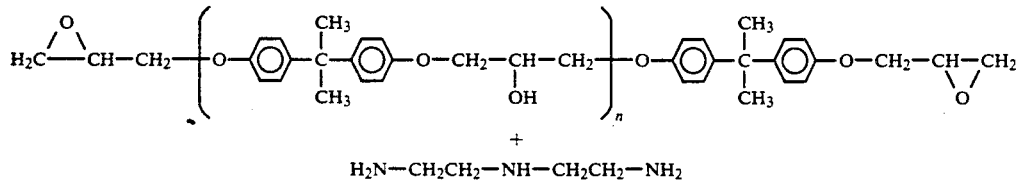

+

H₂N—CH₂CH₂—NH—CH₂CH₂—NH₂

Unsaturated polyester resin

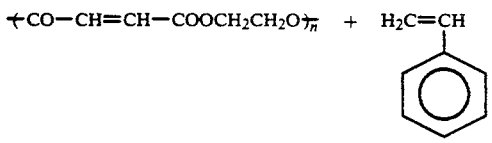

Silicone resin

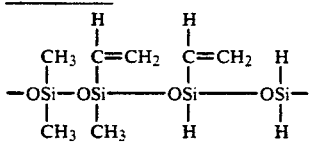

When it is required to add a resin able to be crosslinked into a ferroelectric liquid crystal composition, the resin is added to form a weight fraction of the resin able to be crosslinked of 5 to 90%, preferably 10 to 70%. If the amount of the resin able to be crosslinked is too large, contrast will be decreased because the quantity of the liquid crystal is not sufficient. If the amount of the resin able to be crosslinked is too small, the filling up between the upper and lower substrates will become insufficient causing a decrease in the dynamic stability of the product device.

The method of mixing the ferroelectric liquid crystal and the resin able to be crosslinked is not particularly limited so far as the method permits the formation of capsules of liquid crystal part, and some examples of the method include the following simple mixing method and solution mixing method.

Simple mixing method is a method of kneading a resin which is able to be crosslinked but not yet crosslinked and a ferroelectric liquid crystal at room temperature or in a range of temperature in which the ferroelectric liquid crystal does not exhibit crystal phase or glass phase but exhibit a liquid crystal phase, isotropic phase or a mixed phase thereof. The preferred degree of kneading is such that capsules of liquid crystal part of not more than several hundred μm in size can be formed, but a kneading providing a mixture homogeneous under visual observation will suffice practical demands.

Solution mixing method is a method of mixing a ferroelectric liquid crystal and a resin which is able to be crosslinked but not yet crosslinked, after dissolving them in a solvent. As the solvent, various kinds of solvents can be used, for example methylene chloride, chloroform, toluene, xylene, tetrahydrofuran, methyl ethyl ketone, dimethylacetamide, and dimethylformamide. A uniformly dispersed mixture can be obtained by evaporating the solvent and, further, the size of capsules of liquid crystal can be varied by controlling the rate of evaporation.

In the present invention, the smectic liquid crystal material used for the production of the liquid crystal optical device consists of the above-described ferroelectric liquid crystal or a composition consisting of the ferroelectric liquid crystal and one or more additives, for example, the above-described thermoplastic resins, the resins able to be crosslinked, and other common additives such as adhesives, plasticizers, coloring matters, etc.

Liquid crystal optical devices comprising a smectic liquid crystal can be produced by a method of laminating substrates bearing electrode and a film of smectic liquid crystal or by a method comprising forming a layer of a smectic liquid crystal on a substrate bearing electrode by application or the like, and then laminating another substrate bearing electrode on the obtained film.

In the former method, a film of a smectic liquid crystal is formed by employing a film forming technique commonly employed for ordinary polymers, such as casting technique, extrusion technique, and press technique, and supporting the both sides of the film by flexible substrates equipped with transparent electrode, to produce a liquid crystal optical device. In the obtained liquid crystal optical device, the smectic liquid crystal is not required to have been subjected to orientation treatment.

The latter method is suitable for the present invention because it is advantageous in that the range of the desirable operation condition is wide, the thickness of the film can be widely varied, and so on. Some examples of the method of application include a method of applying a solution of a smectic liquid crystal dissolved in a proper solvent by means of gravure coating, roll coating or the like.

There is no particular restriction in the method of producing the liquid crystal optical device to be employed in the present invention, which includes a smectic liquid crystal to be oriented by a bending treatment and two flexible substrates, the substrates supporting the smectic liquid crystal between them and bearing their respective electrodes, and any known method other than the methods described above can be employed.

The thickness of the film of the smectic liquid crystal may be generally adjusted in the range of about from 0.5 to 10 μm, preferably from 0.5 to 4 μm.

Figure 1:
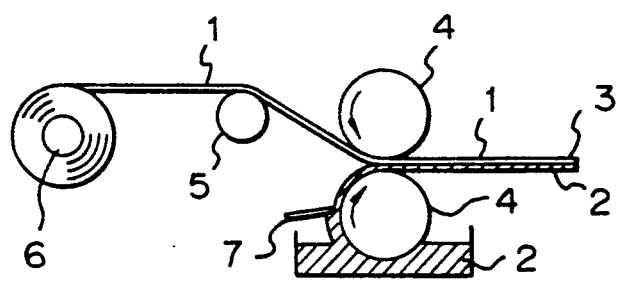

FIG. 1 is a view illustrating an example of a method of forming a layer film of smectic liquid crystal by an application method suitable as the step previous to the orientation step according to the present invention and supporting step by lamination, etc.

In FIG. 1, the referential numeral 1 represents a flexible substrate bearing electrode layer, the referential numeral 2 represents a smectic liquid crystal, the referential numeral 3 represents a laminated substrate consisting of the flexible substrate bearing electrode layer 1 and the layer of the smectic liquid crystal 2 applied on the substrate, the referential numeral 4 represents a roll coater, the referential numeral 5 represents a support roll, the referential numeral 6 represents a supply roll, and the referential numeral 7 represents a doctor knife for scraping.

When the smectic liquid crystal is to be finished to be a thin layer, the continuity between the substrates may be prevented by providing an insulating spacer made of, for example, silicon oxide or an insulating plastic, between the substrates in the film-forming step or the supporting step, or by previously providing an insulating layer of a thin polymer, etc. between the substrate and the smectic liquid crystal layer by application method or the like.

The thickness of the insulating layer is not particularly limited and the preferred thickness is generally not more than 1 μm, preferably not more than 0.5 μm.

As the method of supporting the applied smectic liquid crystal layer by layering the opposite substrate on it, for example, usual lamination technique using pressure roller, etc. may be suitably employed.

At the time of the supporting operation, the two substrates may be fixed with an epoxy-based adhesive, etc., if desired.

Figure 2:
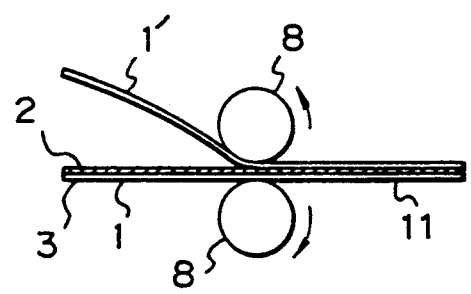
FIG. 2 is a schematic view illustrating a laminating system suitable for the step previous to the orientation step according to the present invention.

FIG. 2 shows one of the simplest example of the laminating technique using pressure rollers.

In FIG. 2, the referential numeral 8 represents a pair of pressure rollers, the referential numeral 3 represents a flexible substrate bearing electrode layer 1 applied with a smectic liquid crystal w, and the referential numeral 1' represents an opposite flexible substrate bearing electrode layer.

An example of the continuous and high speed mass-production method suitable for the production of the liquid crystal optical devices to be used in the present invention is a method wherein a smectic liquid crystal is continuously applied on one flexible plastic substrate bearing electrode structure by the above-described application method, etc. while moving the substrate at a high speed, and subsequently layering another opposite plastic substrate bearing electrode on the smectic liquid crystal layer to continuously laminate them.

According to the orientation method of the present invention, the smectic liquid crystal in a liquid crystal optical device, for example, the liquid crystal optical device produced by the manner described above, is oriented by subjecting the liquid crystal optical device to a bending treatment.

When a smectic liquid crystal having a small macroscopic modulus of elasticity in its multi-domain state, such as an ferroelectric polymer liquid crystal, is used in the orientation method of the present invention, a sufficient orientation can be attained merely by bending.

Figure 3A:
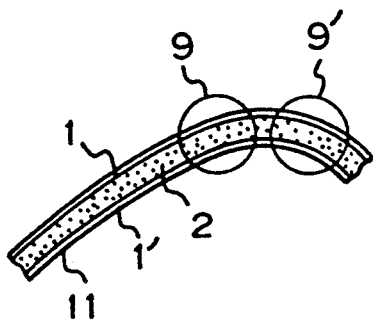
FIGS. 3(a) and 3(b) are the schematic views showing the distribution of the shear stress applied by a bending treatment according to the present invention to the vicinity of the bending treated portion of the smectic liquid crystal in a liquid crystal optical device, (a) being a schematic view showing the state of bending treatment to a liquid crystal optical device according to the present invention, and (b) being a partially enlarged view of the portion subjected to the bending treatment.
Figure 3B:
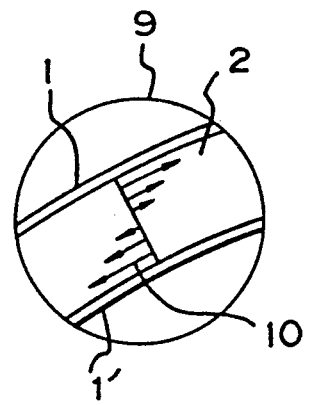

It can be presumed that the high degree of orientation attained by the bending treatment is attributable to the very small shear stress shown in FIG. 3 which is caused by the bending action and applied to the part of the smectic liquid crystal neighboring the part subjected to the bending treatment.

FIG. 3 is a schematic view illustrating the distribution of the shear stress applied by a bending treatment to the bending treated portion of a smectic liquid crystal in a liquid crystal optical device, wherein the figure (a) is a schematic view showing an example where a liquid crystal optical device 11 is being subjected to a bending treatment, each of referential numeral 1 and 1' represents a flexible substrate bearing electrode layer, the referential numeral 2 represents a smectic liquid crystal, and the referential numeral 9' represents the part of the liquid crystal optical device 11 being subjected to a bending treatment, and the figure (b) is a partially enlarged view of the portion subjected to a bending treatment, wherein arrows show distribution of the shear stress applied to the smectic liquid crystal by the bending treatment.

Because smectic liquid crystals have a larger modulus of elasticity than nematic liquid crystals, bending treatment is apt to cause a deformation due to the slip occurred between the contacting domain units rather than a uniform deformation.

When a ferroelectric liquid crystal having a tilt angle is used in the orientation method of the present invention, it is preferable to conduct the bending treatment with the bending direction of the bending treatment adjusted so that the bending direction and the optically principal axis (orientation direction) of at least one of the substrates approximately make, on the plane of the substrate, the tilt angle $\theta$ of the ferroelectric liquid crystal or $90° - \theta$, or with the bending direction adjusted so that bending direction and the longitudinal direction of the substrates approximately make, on the planes of the substrates, the tilt angle $\theta$ of the ferroelectric liquid crystal or $90° - \theta$. Herein, the bending direction refers to a direction of a line bounding two planes formed on a surface of a substrate at the time of bending the substrate.

For example, when substrates exhibiting optical anisotropy, such as uniaxially or biaxially oriented PET, are used, it is preferable to conduct the bending treatment with the bending direction adjusted so that the bending direction and the optically principal axis (orientation direction) of the substrates approximately make, on the plane of the substrates, the tilt angle $\theta$ of the ferroelectric liquid crystal or $90° - \theta$.

Figure 4:
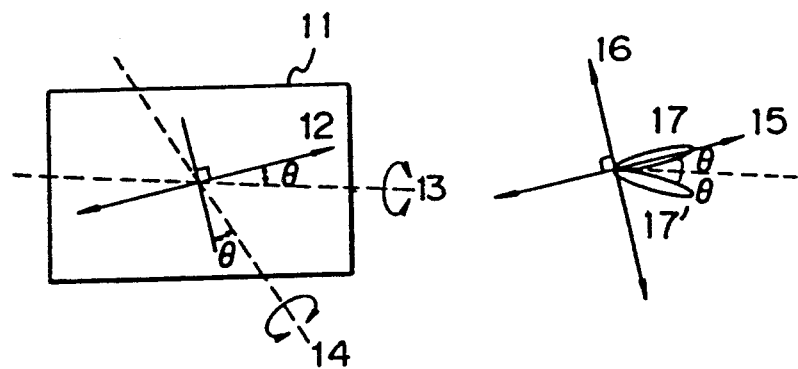
FIG. 4 is a view illustrating the relation between bending direction and a polarizer in the orientation method according to the present invention.

FIG. 4 illustrates the relation between the bending direction of a liquid crystal device and a polarizer. The referential numeral 11 represents a liquid crystal optical device enclosing a ferroelectric liquid crystal therein, the referential numeral 12 represents the optically principal axis of substrate, each of the referential numerals 13 and 14 represents a bending direction of the device, each of the referential numerals 15 and 16 represents the polarizing axis of the polarizer, the referential numeral 17 represents the orientation direction of the liquid crystal (darkness) at the time when an electric field is applied in a certain direction, and the referential numeral 17' represents the orientation direction of the liquid crystal (light) at the time an electric field is applied in the opposite direction. For example, a bending treatment along the bending direction 13 makes domains of liquid crystal orient in a direction parallel with the dotted line 13. Thus oriented device can be switched between light and dark states by arranging two polarizers outside the device 11 with their polarizing axes 15 and 16 perpendicularly intersecting each other and, subsequently, switching the orientation direction of the liquid crystal between 17 and 17' by switching the electric field between positive and negative. Of course, the two polarizers may also be arranged with both of their polarizing axes directed in one direction 15 or 16 to be parallel to each other. In the latter case, the switching between light and darkness is reversed. When substrates exhibiting optical anisotropy are used, the obtained liquid crystal device can be delivered from the effect of the optical anisotropy by adjusting the bending direction so that the bending direction and the optically principal axis of at least one of the substrates make $\theta$ or $90° - \theta$.

Although it is preferable to adjust each of the angles described above accurately, errors not more than 10° are allowable. To obtain a high contrast, it is preferable to keep the errors not more than 5°.

The orientation by means of the bending treatment can be more effectively performed by heating the liquid crystal optical device to a proper temperature depending on the kind of the liquid crystal.

In the orientation method of the present invention, it is generally preferable to conduct the bending treatment within a range of temperature where the smectic liquid crystal exhibits at least one liquid crystal phase, such as a mixed phase of isotropic phase and smectic A phase, a mixed phase of isotropic phase and chiral smectic C phase, smectic A phase or chiral smectic C phase.

In order to attain a uniform orientation in the whole liquid crystal cell, it is preferable to conduct the bending treatment in the course of continuous move of the liquid crystal optical device.

In the orientation method of the present invention, the above-described orientation by a bending treatment can be conducted by using various kinds of apparatuses and systems. It is generally suitable to use a method of subjecting a liquid crystal optical device to a bending treatment using at least one free rotation roll in the course of continuous move of the liquid crystal optical device, preferably a method of subjecting a liquid crystal optical device to a bending treatment in the course of continuous move of the liquid crystal optical device moving through at least two free rotation rolls.

Figure 5:
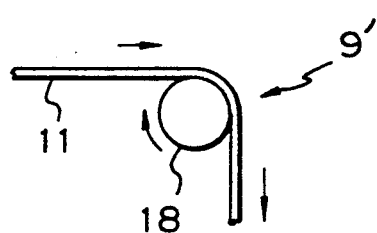

FIG. 5 is a schematic view illustrating an embodiment of the orientation method according to the present invention, wherein a liquid crystal optical device 11 is subjected to a bending treatment using one roll 18 in the course of continuous move of the liquid crystal optical device.

In FIG. 5, the referential numeral 9' represents the part of the liquid crystal optical device 11 being subjected to bending treatment.

Hereinafter, the orientation operation by bending treatment according to the present invention will be described in more details.

In the orientation method of the present invention, it is preferable to conduct the bending treatment with the bending degree of the liquid crystal optical device adjusted within generally 5 to 1,000 mm, preferably 10 to 500 mm, as measured as the radius of curvature.

Too small radius of curvature is apt to damage substrates or to cut electrode structures delicate in pattern and, on the other hand, if the radius of curvature is too large, the shear stress applied to the liquid crystal may become insufficient resulting in a poor orientation state.

In the orientation method of the present invention, orientation of smectic liquid crystals by means of the above described bending treatment can be performed more effectively and more efficiently by subjecting a liquid crystal optical device to the bending treatment in the course of continuous move of the liquid crystal optical device. Particularly, it can be performed furthermore effectively at a high speed, enabling mass production, by continuously moving the liquid crystal optical device through at least two free rotation rolls to subject the liquid crystal optical device to a bending treatment.

The moving speed of the liquid crystal optical device during the bending treatment cannot be uniformly defined because it varies depending on the radius of curvature at the bending part, temperature, the kind of the smectic liquid crystal, etc. It is generally sufficient to adjust the speed to the line speed of a continuous production process including a step of film-forming by application and a step of lamination treatment. Therefore, it is possible to equalize all of the line speeds of various steps including the orientation step by a bending treatment, whereby a continuous, high-speed process for mass producing liquid crystal optical devices can be efficiently realized, resulting in an extreme improvement of mass productivity.

In the above-described continuous, high-speed mass production process, the suitable moving speed of liquid crystal optical device during the bending treatment ranges generally from 0.1 to 50 m/min. (0.16 to 83.3 cm/sec.).

The above-described preferred moving speed of liquid crystal optical device during bending treatment has been established mainly considering the condition in application operation.

Therefore, there is no particular limit in the moving speed suitable only for bending treatment, and the range can be larger that the above-described range. However, if the moving speed is too high, some kinds of substrates may suffer a damage, such as cracking, during the bending treatment, and on the other hand, if it is too low, although a sufficient orientation will be attained, the production time will be elongated resulting in a decrease of practicality.

In the above-described orientation treatment by bending treatment, it is not necessarily required to adjust temperature accurately. In order to attain extremely good orientation at widely ranging line speeds (line speed: a speed corresponding to the winding speed of product) ranging widely, particularly at a very high line speed, it is preferable to conduct the bending treatment with the temperature of the smectic liquid crystal in liquid crystal optical device adjusted to a range of temperature wherein the smectic liquid crystal exhibits a phase selected from smectic A phase, chiral smectic C phase, a mixed phase of isotropic phase and smectic A phase, and a mixed phase of isotropic phase and chiral smectic C phase. It is particularly preferable to conduct the bending treatment while cooling the smectic liquid crystal from a temperature at which the liquid crystal exhibits isotropic phase to a temperature at which the liquid crystal exhibits a liquid crystal phase such as smectic A phase or chiral smectic C phase.

Hereinafter, an embodiment of the orientation method wherein orientation treatment is performed by conducting bending treatment while cooling liquid crystal from an isotropic phase temperature to a liquid crystal phase temperature, referring to drawings.

Figure 6:
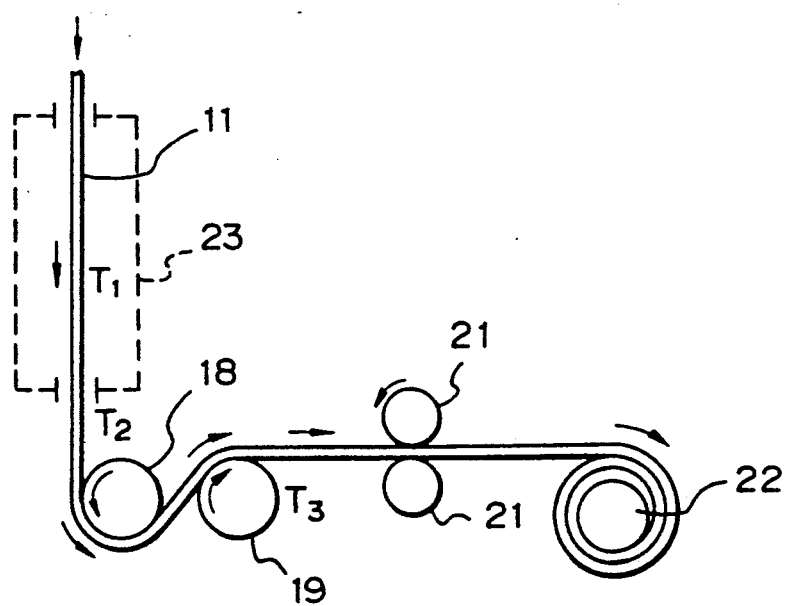
Figure 7:
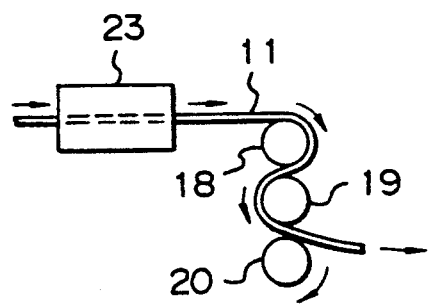
FIG. 7 is a schematic view illustrating an embodiment of the method of orientation according to the present invention.

Each of FIG. 6 and FIG. 7 is schematic view illustrating, as a particularly preferred embodiment of the orientation method according to the present invention, an example of continuous orientation method wherein bending treatment is conducted while cooling liquid crystal from an isotropic phase temperature to a liquid crystal phase temperature.

In FIG. 6, the referential numeral 11 represents a liquid crystal optical device, each of the referential numerals 18 and 19 represents a free rotation roll for applying bending treatment, the referential numeral 21 represents a pair of support rolls, the referential numeral 22 represents a winding roll, the referential numeral 23 represents a heating apparatus, and the referential symbols $T_1$, $T_2$, and $T_3$ represent the temperatures of the heating apparatus 23, the free rotation rolls 18, and the free rotation rolls 19, respectively.

In FIG. 7, the referential numeral 11 represents a liquid crystal optical device, each of the referential numerals 18, 19, and 20 represents a free rotation roll for applying bending treatment, and the referential numeral 23 represents a heating apparatus.

In the example of orientation method shown in FIG. 6, a liquid crystal optical device 11 is, at first, heated by a heating apparatus 23 to a temperature at which the ferroelectric liquid crystal in the liquid crystal optical device 11 exhibits isotropic phase, in the course of continuous move of the liquid crystal optical device moving through the heating apparatus 23 adjusted to a temperature $T_1$. Subsequently, in the course of continuous move of the liquid crystal optical device moving from a free rotation roll 18 of a temperature $T_2$ to another rotation roll 19 of a temperature $T_3$, the liquid crystal optical device 11 is then subjected to an orientation treatment by bending treatment using the two free rotation rolls 18 and 19 while cooling the ferroelectric liquid crystal to a temperature at which it exhibits a liquid crystal phase. The obtained oriented product is then moved through between a pair of support rolls 21 and is continuously wound up by a winding roll 22.

In the above method, it is sufficient to adjust the temperature $T_1$ so that the heated liquid crystal optical device 11 can maintain isotropic phase until, at least, the liquid crystal optical device 11 begins to be subjected to bending treatment. It is also sufficient to adjust the temperatures $T_2$ and $T_3$ so that before the conclusion of the bending treatment, the liquid crystal optical device 11 can be cooled to a temperature at which it exhibits a liquid crystal phase.

In the above method, it is generally suitable for the above method to adjust the temperature $T_1$ to a higher temperature than the temperatures $T_2$ and $T_3$.

The temperatures $T_2$ and $T_3$ may be identical with or different from each other. However, in order to make the control of temperature easy considering the heat capacity of the liquid crystal optical device and to maintain stable operation for a long time, it is generally desirable to maintain the temperature $T_3$ lower than the temperature $T_2$.

In the example of orientation method shown in FIG. 7, the orientation is conducted in the same way as described in FIG. 6 with the only exception that three free rotation rolls are used in FIG. 7.

In the orientation method of the present invention, there is no particular restriction in the arrangement of the free rotation rolls to be used in the orientation by bending treatment. However, it is particularly preferable to conduct the bending treatment, as the examples shown in FIG. 6 and FIG. 7, by arranging at least two free rotation rolls in sequential order and continuously moving a liquid crystal optical device through the free rotation rolls.

Although there is no particular restriction in the number of the free rotation rolls to be used, it is generally sufficient to use two or three free rotation rolls to attain satisfactorily high orientation.

Figure 8:
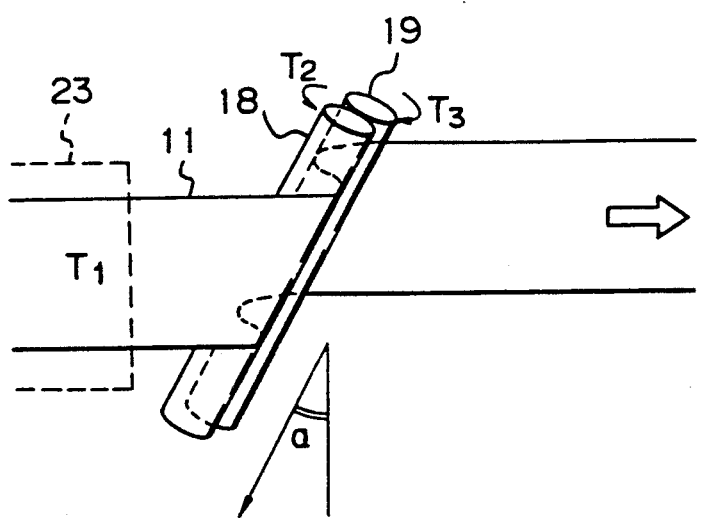
FIG. 8 is a schematic view illustrating an embodiment of the orientation method according to the present invention.

FIG. 8 is a schematic view illustrating a particularly preferable embodiment of the above-described continuous orientation method according to the present invention wherein bending treatment is conducted with the bending direction inclining at an angle, while cooling the temperature from a isotropic phase temperature to a liquid crystal phase temperature.

In FIG. 8, the referential numeral 11 represents a liquid crystal optical device, each of the referential numerals 18 and 19 represents a free rotation roll, the referential numeral 23 represents a heating apparatus, and the referential numerals $T_1$, $T_2$, and $T_3$ represent the temperatures of the heating apparatus 23, the free rotation roll 18, and the free rotation roll 19, respectively.

In the orientation method shown in FIG. 8, in the course of continuous move of the liquid crystal optical device 11, the liquid crystal optical device 11 is heated to a temperature at which the smectic liquid crystal in the liquid crystal optical device exhibits isotropic phase by the heating apparatus 23 adjusted to a temperature $T_1$, and then the liquid crystal optical device 11 is subjected to bending treatment for orientation in the course of continuous move of the liquid crystal optical device 11 moving through the two free rotation rolls 18 and 19 adjusted to temperatures $T_2$ and $T_3$, respectively, while cooling the smectic liquid crystal to a temperature at which it exhibits a liquid crystal phase. At the time, the two rolls are arranged so that the bending direction of the substrate and the direction right-angled to the principal axis of at least one of the substrate make $\theta$ or $90° - \theta$. The number of the rolls is not limited to two but also may be one or three or more. The preferred number is two or more. In the above method, it is sufficient to adjust the temperature $T_1$ so that the heated liquid crystal optical device 11 can maintain isotropic phase until, at least, the liquid crystal optical device 11 begins to be subjected to bending treatment. It is also sufficient to adjust the temperatures $T_2$ and $T_3$ so that before the conclusion of the bending treatment, the liquid crystal optical device 11 can be cooled to a temperature at which it exhibits a liquid crystal phase.

In the above method, it is generally suitable to adjust the temperature $T_1$ to a higher temperature than the temperatures $T_2$ and $T_3$.

The temperatures $T_2$ and $T_3$ may be identical with or different from each other. However, in order to make the temperature control easy considering the heat capacity of the liquid crystal oprical device, and to maintain stable operation for a long time, it is generally desirable to maintain the temperature $T_3$ lower than the temperature $T_2$.

In the orientation method of the present invention, there is no particular restriction in the arrangement of the free rotation rolls to be used in the orientation by bending treatment. However, it is particularly preferable to conduct the bending treatment, as the examples shown in FIG. 8, by arranging at least two free rotation rolls in sequential order and continuously moving a liquid crystal optical device through the free rotation rolls.

As apparent from the above description, the method of orienting liquid crystal optical device according to the present invention is extremely advantageous in practical use in that a high degree of orientation can be attained by extremely simple procedures without requiring complicated pretreatment to substrates, etc., for example rubbing treatment or incline deposition treatment; liquid crystal optical devices having excellent high speed response property, contrast ratio, etc. can be obtained in an efficient manner; and a high speed and continuous mass-production system can be easily realized. The orientation method of the present invention are, therefore, suitable for orientation method in a production process of various kinds of smectic liquid crystal optical devices with supporting substrates bearing electrodes.

Figure 9:
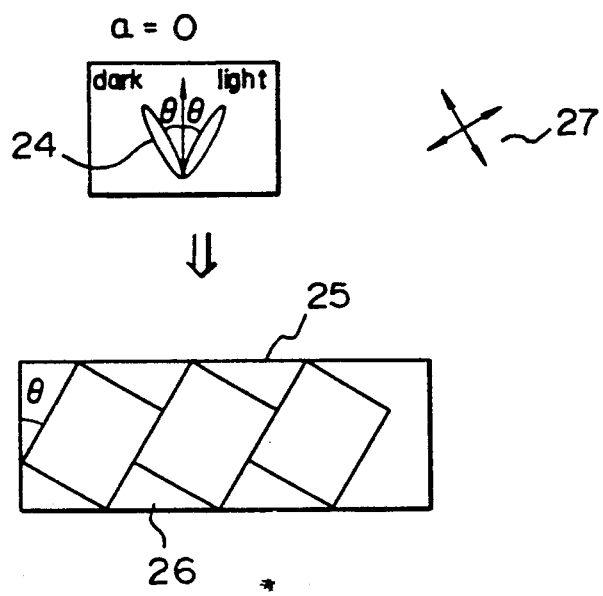
Figure 10:
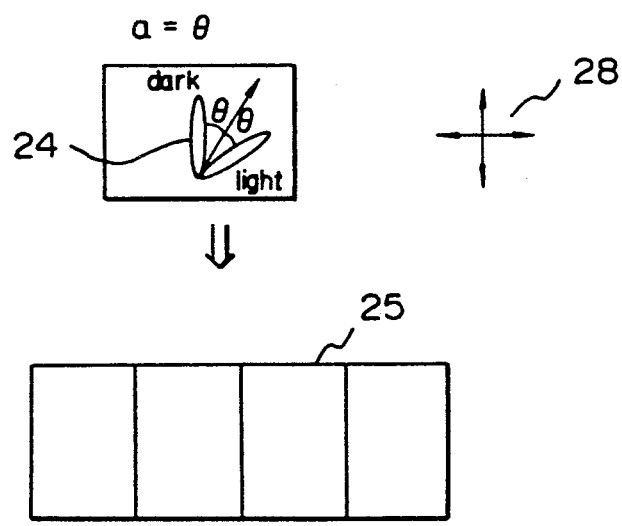
FIG. 10 is a view illustrating respectively the inclination of a liquid crystal molecule and the relation between the direction of polarizer and polarizing plate when a liquid crystal optical device oriented under a condition of $a=0°$ or $a=\theta$ is used as a display device together with polarizers by applying an electric field between the upper and lower electrode layers.

Next, if a substrate having no optical anisotropy, such as PES (polyethersulfones), PC (polycarbonates) or PS (polysulfones), is used, it is preferable to conduct bending treatment with the bending direction of the bending treatment adjusted so that the bending direction and the longitudinal direction of the substrates approximately make $\theta$ or $90° - \theta$. Each of FIG. 9 and FIG. 10 is a view illustrating respectively the inclination of a liquid crystal molecule 24 and the relation between the direction of polarizers (27 or 28) and the polarizing plate when a liquid crystal optical device oriented under a condition of $a = 0°$ or $a = \theta$ is used as a display device together with polarizers, by applying an electric field between the upper and lower electrode layers. The liquid crystal molecule 24 inclines from the major axis of the oriented liquid crystal molecule to make an angle, $+\theta$ or $-\theta$, between them and exhibits dark state or light state. When bending treatment is conducted under the condition of $a = 0$, the part 26 of the polarizing plate 25, as shown in FIG. 9, will become useless. On the other hand, when bending treatment is conducted under the condition of $a = \theta$, the polarizing plate 25 can be used without wasting any portion.

Hereinafter, referring to the drawings, other embodiments of the method of orienting liquid crystal optical device and the apparatus for the orientation method according to the present invention will be described in details.

Figure 11:
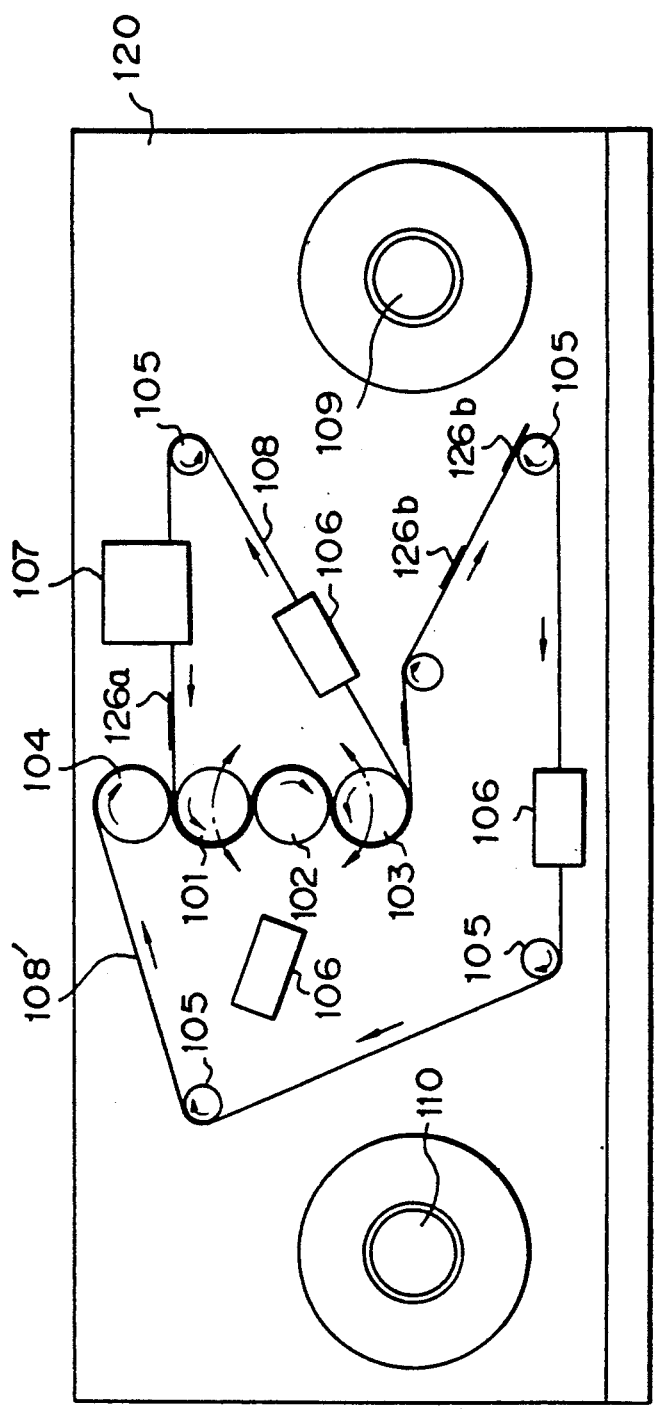

FIG. 11 is a schematic view illustrating an embodiment of the apparatus for orientation according to the present invention and, at the same time, illustrating an embodiment of the orientation method according to the present invention.

In the embodiment shown in FIG. 11, two belts, i.e. a downside belt 108 and an upside belt 108', are used as the supporting means for suppoting liquid crystal optical device. In this embodiment, both of the two belts form their respective loops in a state of a conveyer (endless conveyer). In the present invention, although the two belts are not necessarily required to form a loop, it is preferable, from the viewpoint of the productivity and convenience in operation, that at least one forms a loop, and it is particularly preferable that both belts form their respective loops.

In the method of the present invention, a liquid crystal optical device is supported preferably between two belts and is subjected to bending treatment by moving the belts supporting the liquid crystal optical device between them so that the two outer surfaces of the belts by turns come closely into contact with the roll surfaces of at least two heating rolls whereby the liquid crystal in the liquid crystal optical device is oriented to a high degree. The supporting structure is not limited to a belt, and any supporting structure similar to belt may be used.

In the method and apparatus of the present invention, the heating roll is not particularly limited in number so long as two or more heating rolls are used, and it is generally sufficient to use two to four, preferably three heating rolls.

In the method of the present invention, the system for moving a belt is not particularly limited. Generally, a moving system by properly arranged driving rolls or the like is suitable. In the apparatus of the present invention, at least one driving roll is provided to move the belts.

In the method and apparatus of the present invention, driving rolls may also serve as heating rolls.

Further, it is preferable to control the move of belts by properly providing support rolls or guide rolls.

The materials, sizes, arrangement, etc. of these rolls may be properly selected so that the effect of the present invention can be sufficiently performed.

The heating rolls are not particularly limited in the materials, and common materials, for example metals such as stainless steel or the like may be suitably used, particularly stainless steel or the like are preferable. On the other hand, the material for driving rolls (including those used also as heating rolls) is not particularly limited so long as it can provide sufficient driving force and conforms to condition in use. The preferred generally include rubbers and ones similar to rubbers, and the particularly preferred materials are rubbers.

Figure 13:
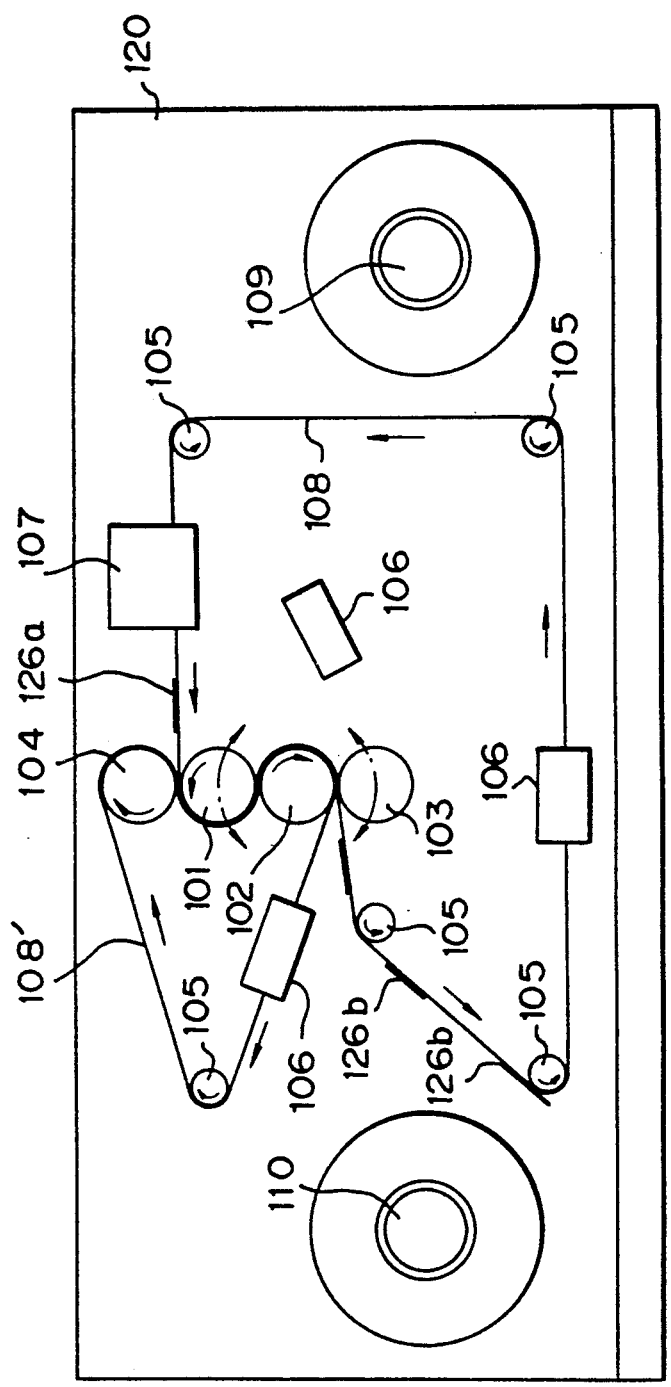
Figure 14:
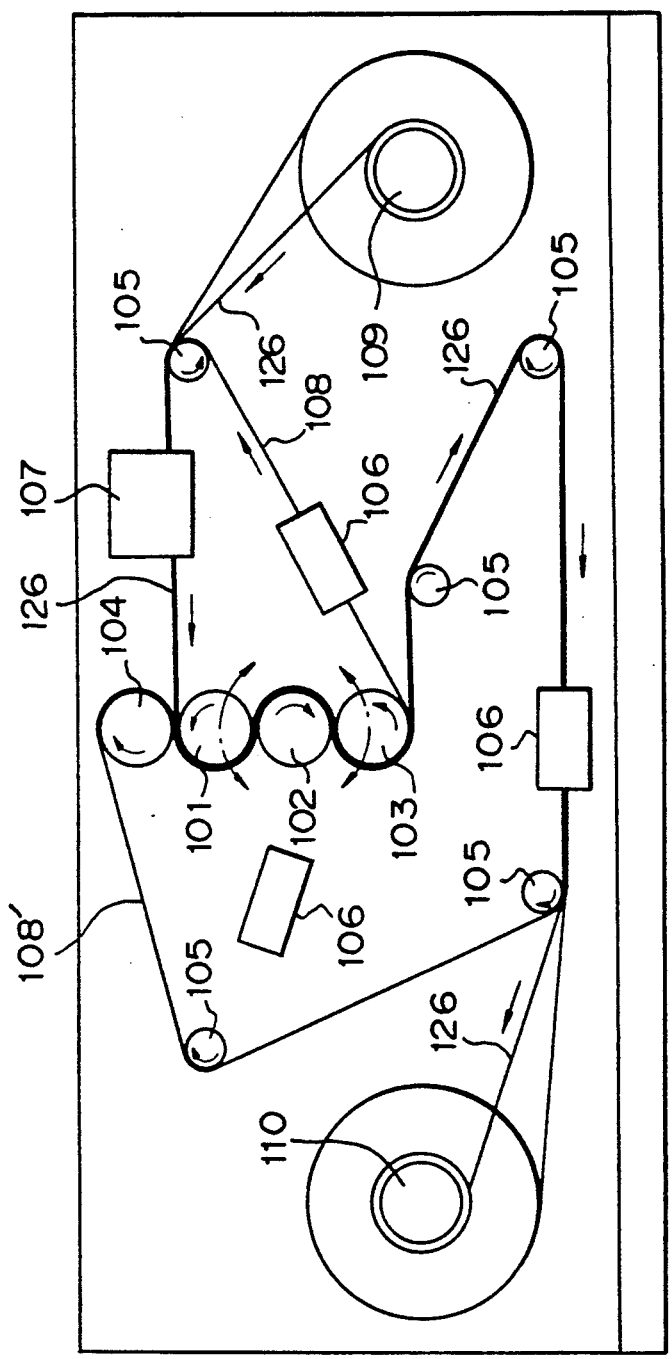
Figure 15:
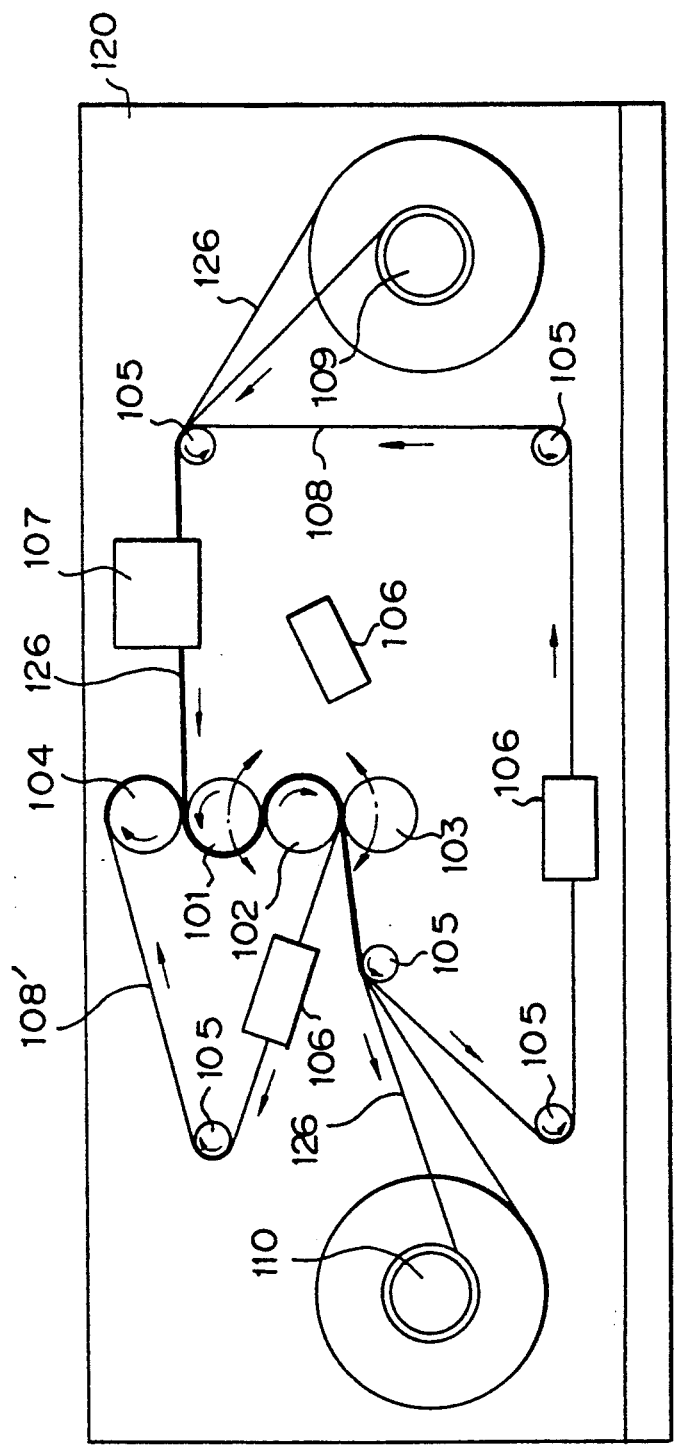
FIG. 15 is an elevational view schematically illustrating respectively an embodiment of the orientation method according to the present invention and the construction of an embodiment of the orientation apparatus used for the above-orientation method.

In the embodiment shown in FIG. 11, three heating rolls, i.e. heating rolls 101 to 103, are arranged so that each roll comes into contact with another one in the order of the arrangement, and there is also provided a support roll 104. Among them, the heating roll 102 doubles as a driving roll. Each of the belts 108 and 108' respectively forms an independent loop and circulate through the heating rolls and the guide rolls 105. In the course of the circulation, the liquid crystal optical device supported between the belts is subjected to bending treatment during the move through each heating roll. In the embodiment shown in FIG. 11, between the heating roll 101 and the support roll 104, liquid crystal optical device 126a is sandwiched between the upper belt 108' and the under belt 108, and moves, in the state supported between the belts, through between the heating roll 101 and the heating roll (driving roll) 102 and between the heating roll (driving roll) 102 and the heating roll 103 in order while being oriented by bending. At the time of departing from the heating roll 103, the two belts 108 and 108' are separated from each other in different directions to collect an oriented liquid crystal optical device 126b. The points of supply and collection and the moving system (the route, etc.) of the belts 108 and 108' are not limited to those shown in FIG. 11 and, for example, the systems which are shown in FIGS. 13 to 15 and will be described later may also be suitably employed.

Although FIG. 11 shows the liquid crystal optical device to be subjected to orientation as a relatively short piece and illustrates the liquid crystal optical device being supplied on the under belt 108 and being collected as plased on the upper belt 108', liquid crystal optical may also be used in a form of a sufficiently lengthy device. In the latter case, from the viewpoints of productivity and convenience of operation, it is suitable to employ a system wherein the lengthy liquid crystal optical device is continuously supplied from a supply roll 109 to which the device has been wound in a roll state and is continuously collected being wound up by a winding roll 110. Alternately, the oriented liquid crystal optical device may also be discharged from the orientation system without using a winding roll but by using driving rolls other than those shown in FIG. 11, leaving the sheet-form of the device as it is.

In the apparatus shown in FIG. 11, three tension controllers 106 and one panel angle controller 107 are provided. By providing the tension controllers 106 in a proper arrangement and applying a proper tension to the belts 108 and 108', the slip between driving roll (heating roll 102) and the belts 108 and 108' can be prevented and the bending treatment for a high degree of orientation can be efficiently performed. Therefore, it is preferable to provide such tension controllers in a proper arrangement. In such a case, the preferred driving roll (heating roll 102) is a rubber roll.

On the other hand, the panel angle controller is provided to control the panel angle of the liquid crystal optical device to be subjected to orientation, whereby a high degree of orientation of liquid crystal by means of bending treatment can be more effectively performed.

In the orientation method shown in FIG. 11, among the three tension controller 106, the upper left-hand tension controller is left unused, and the other two tension controllers 106 respectively load the belts 108 and 108' with a proper tension. FIG. 13 shows another embodiment of orientation method using an apparatus similar to that used in the method shown in FIG. 11. In the method shown in FIG. 13, with the upper right-hand tension controller (106) left unused, tension is controlled by passing the belts 108 and 108' respectively through the other two tension controllers. That is, in the embodiment shown in FIG. 13, the belts 108 and 108' move taking a route partially different from that of the embodiment shown in FIG. 11. Accordingly, the arrangement of the guide rolls 105 is altered. Further, in the embodiment shown in FIG. 13, the liquid crystal optical device is taken out after it comes out through between the heating roll (driving roll) 102 and the heating roll 103.

Hereinafter, the control of temperature in the bending orientation of liquid crystal will be described referring the means of the embodiment shown in FIG. 11.

At first, the heating roll 101 heats a liquid crystal optical device to a temperature at which the liquid crystal in the device exhibits isotropic phase, and subsequently, the heating roll 102 (driving roll) and the heating roll 103 control the temperature of the liquid crystal optical device so that the liquid crystal exhibits a liquid crystal phase, such as a mixed phase of isotropic phase and smectic A phase or a mixed phase of isotropic phase and chiral smectic C phase. It is generally preferable that the heating roll 102 adjusts the temperature of the liquid crystal optical device to a temperature 5° to 10° C. lower than the temperature at which phase transition of the liquid crystal to isotropic phase occurs. The spaces between the heating rolls 101 and 102 and between the heating rolls 102 and 103 are not particularly limited. It is generally preferable to adjust the spaces not more than 3 mm because such a space prevents the liquid crystal from cooling to a temperature lower than the desired control temperature, whereby a high degree of orientation can be attained by merely rotating the heating rolls without providing any other particular heating mechanisms.

Next, the orientation direction of the liquid crystal in a liquid crystal optical device will be described in details by using the embodiment of the present invention shown in FIG. 11 as an example and referring to FIG. 11.

In the orientation method of the present invention, it is an important point that the bending direction of bending treatment on the surface of substrate is adjusted so that the bending direction and the direction of the optically principal axis (orientation direction) of substrate approximately make the tilt angle $\theta$ of ferroelectric liquid crystal used or $90° - \theta$, or the bending direction and the longitudinal direction of substrate approximately make the tilt angle $\theta$ of ferroelectric liquid crystal used or $90° - \theta$. Bending direction means the direction of the straight line in which two planes of a substrate formed by bending the substrate intersect. When using a substrate having optical anisotropy, such as uniaxially or biaxially oriented PET, it is preferable to adjust the bending direction so that the bending direction and the direction of the optically principal axis of substrate make $\theta$ or $90° - \theta$. The control of the orientation direction can be suitably conducted by using a panel angle controlling device. That is, orientation direction can be constantly adjusted to be uniform by using a panel angle controlling device in which the liquid crystal optical device 126a is placed on the downside belt 108 with the angle (a) adjusted as shown in FIG. 17. The control of orientation direction is also applicable to the continuous (supply) orientation treatment for lengthy liquid crystal optical devices shown, as examples, in FIG. 14 to FIG. 16.

The degree of bending liquid crystal optical device in the bending treatment is as described above.

Because the above-described orientation of ferroelectric liquid crystal by bending treatment is conducted with a liquid crystal optical device supported by at least one belt, the orientation method of the present invention is also applicable to liquid crystal optical devices of cut-sheet type and therefore, a plural number of liquid crystal optical devices can be efficiently and continuously oriented in a high speed and in a mass-production scale.

Next, orienting speed will be described referring to the example shown in FIG. 11.

In order to have the orientation method of the present invention applicable to an extensive range of liquid crystal materials including low molecular weight liquid crystals, polymer liquid crystals, and mixtures thereof, it is preferable to employ an operation system in which the orienting speed is adjusted by controlling the rotating speed of heating rolls (driving rolls). Also, the orienting speed may be controlled by directly driving each roll.

Next, the relation between the bending treatment using a group of rolls including heating rolls and the arrangement of the rolls will be described in details by using FIG. 11, etc. as examples and referring to FIG. 12.

In order to orient liquid crystals to a high degree, it is desirable to load a proper bending force to liquid crystals. Therefore, it is preferable to employ an arrangement and a system for controlling arrangement in which the bending force of the heating rolls can be adjusted so as to make the orientation method applicable to a wide range of liquid crystal materials as described above. For example, the shear force generated by bending can be controlled by properly adjusting the curvature at the time of bending a liquid crystal optical device. The adjustment of the curvature can be effectively and easily accomplished by arranging the heating rolls 101 and 103 so that they can move round the heating roll 102 (driving roll) to either side at the angle of about 45° or less. Herein, with regard to the angle of the movement round the heating roll 102, the anticlockwise moving angle is represented by a plus sign, and the clockwise moving angle by a minus sign. FIG. 12 (a) illustrates the case where both of the moving angle $\theta_1$ of the first heating roll 101 and the moving angle $\theta_2$ of the third heating roll 103 are adjusted to 0°, (b) illustrates the case where $\theta_1 = +45°$ and $\theta_2 = -45°$, and (c) illustrates the case where $\theta_1 = -45°$ and $\theta_2 = +45°$. The largest shear force is obtainable in the case of (b) and on the other hand, the smallest shear force is obtainable in case of (c).

Therefore, a high degree of orientation can be constantly attained by properly adjusting the angles $\theta_1$ and $\theta_2$ to vary the shear force depending on the liquid crystal material used.

Each of FIG. 13 to FIG. 15 schematically illustrates an embodiment of the orientation method according to the present invention.

As apparent from the comparison between FIG. 11 and these figures, the orientation apparatus shown in FIG. 13 to FIG. 15 may be fundamentally identical with that shown in FIG. 11. That is, the same apparatus can be used by altering the moving system (route) of the belts 108 and 108', altering accordingly the point of collecting liquid crystal optical devices or the system of supplying and collecting them, and moving the position of some of the guide rolls 105.

Hereinafter, the construction of the orientation methods and apparatuses will be described only with regard to the difference from those shown in FIG. 11.

In the orientation method shown in FIG. 13, liquid crystal is heated to its isotropic phase temperature by a heating roll 101 and then adjusted to its liquid crystal phase temperature by a heating roll 102 (driving roll) and, at the same time, the liquid crystal is oriented by the two heating rolls. This method is suitably applicable to liquid crystal materials which are relatively easy to orient. Unnecessary decrease in temperature can be prevented by adjusting the space between the heating rolls 101 and 102 to 3 mm or less as described above.

With regard to the orientation apparatuses shown in FIG. 11 and FIGS. 13 to 15, some or all of the guide rolls 105 can be secured at arbitrary points in the side wall plate 120 and further, when altering the number of the heating rolls and the length of contacting portions in which a liquid crystal optical device contacts to heating rolls, the positions of the guide rolls 105 can be properly moved to form a desired loop of belt (conveyer).

Each of FIG. 14 and FIG. 15 shows a continuous method of orienting a lengthy liquid crystal optical device 126 by using three heating rolls. In the method shown in FIG. 15, orientation by bending treatment is conducted by using substantially two heating rolls among the three heating rolls in the same manner as in the method shown in FIG. 13. For the continuous orientation method, it is generally suitable to use flexible substrates exhibiting no optical anisotropy or flexible substrates whose optically principal axes coincide with each other in the longitudinal direction. In this method, orienting speed is generally controlled by controlling the rotating speed of winding roll 110. At the time, it is preferable to isolate the heating roll 102 from driving system because the belts 108 and 108' are circulated by the driving force of the winding roll 110. Therefore, in this case, the winding roll 110 serves as a driving roll.

Next, some examples of the construction of the orientation apparatus according to the present invention and the specifications and materials of constituent elements thereof will be described in details, referring to FIG. 11 to FIG. 15 and FIG. 16. FIG. 16 is a front view schematically showing the construction of the whole orientation apparatus of the present invention.

Heating rolls 101 to 103 (Among these, heating roll 102 may also be used as a driving roll.) are generally used at 40° to 120° C. The shape of heating rolls are not particularly limited and, for example, rolls having a diameter of about 10 to 500 mm and a roll length of about 10 to 2000 mm as effective length may be suitably used.

The heating rolls 101 and 103 are not particularly limited in material and generally, those made of mirror-finished stainless steel may be suitably used. With regard to the material of the heating roll 102 which is to be used as a driving roll according to circumstances, a roll having a surface layer made of rubber may be suitably used, and the sufficient thickness of the rubber is generally about 3 mm.

It is desirable to make the rotating speed of the heating rolls variable in the range about 0 to 50 m/min. as measured as the linear velocity of the belts 108 and 108'. Although the rotation of the heating rolls or the movement of the belts 108 and 108' is conducted by the method using the heating roll 102 as a driving roll or the method using the winding roll 110 as a driving roll as described above, generally, they are not limited to these methods.

The spaces between the heating rolls 101 and 102 and between the heating rolls 102 and 103 are preferably adjusted to about 0.1 to 20 mm. As described above, the heating rolls 101 and 103 are arranged so that they can move round the heating roll 102 to either side at a desired angle with the maximum of about 45°.

The support roll 104 not only supports the supplied liquid crystal optical device but also controls the entry angle thereof. Although the support roll 104 is not limited in material, those made of mirror-finished stainless steel may be suitably used. With regard to the shape of the support roll 104, the roll may be generally about 10 to 500 mm in diameter and 10 to 2000 mm in roll length (effective length).

The guide rolls 105 are not particularly limited in material and generally, those made of aluminum will work sufficiently. With regard to the shapes of the guide rolls 105, the rolls may be generally about 10 to 500 mm in diameter and about 10 to 2000 mm in roll length (effective length). The guide rolls 105 may be properly arranged at desired positions according to the orientation method by securing generally to a side-wall plate 120.

As described above, the panel angle controlling device 107 serves to adjust the arrangement of supplied liquid crystal optical device on the downside belt 108, i.e. panel angle "a", so that the orientation direction and the optically principal axis of the substrate used approximately make the tilt angle of the liquid crystal $\theta$ or $90° - \theta$. The range of angles in which the panel angle is to be adjusted may be generally set to from 0° to 90°. Placement of liquid crystal optical devices on the downside belt 108 may be generally conducted by using one-touch lever system. The widths of the belts 108 and 108' may be generally from about 10 to 2000 mm, and the thickness from about 20 to 500 μm. The materials are not particularly limited and include, for example plastic films of PET, PES, PI, PP, PS or the like and mixed materials thereof with an inorganic filler such as ceramics or metals. Also, these may be coated with aluminum or the like.

The winding roll 110 and supply roll 109 may be generally about 50 to 300 mm in diameter and about 100 to 2000 mm in length. These rolls may be equipped with their respective electromagnetic brakes if needed.

Next, as another embodiment of the present invention, here follows a description of an apparatus for continuously orienting a liquid crystal display device comprising a ferroelectric liquid crystal and two lengthy, transparent, flexible substrates bearing their respective electrode layers, by means of a bending treatment using three heating rolls. The method differs from the above-described methods in that no supporting structure is used.

FIG. 18 is a front view schematically showing the construction of an example of the apparatus for orienting the above-described lengthy liquid crystal display device.

This apparatus comprises three heating rolls 201 to 203, one support roll 204, one guide roll 205, one supply roll 206, and a winding roll 207. The liquid crystal display device supplied from the supply roll 206 is introduced to the upper part of the support roll 204 by the guide roll 205 at a proper angle. The liquid crystal display device 217 is then securely fixed to the first heating roll. Thereafter, it moves round the first, the second, and the third heating rolls in order while closely contacting its face and back by turns to the heating rolls and is then wound up by the winding roll 207 from the lower part of the third heating roll.

Depending upon the kind of liquid crystal materials, liquid crystal display device 217, as shown in FIG. 19, may take a different route as that described above: that is, liquid crystal display device 217 may also be wound up by the winding roll directly after it comes out through between the second and third heating rolls, by moving it through between the support roll 204 and the first heating roll and subsequently, moving it while closely contacting it to only the first and second heating rolls. In this case, substantially, orientation was performed by bending using only two heating rolls, i.e. the first and second heating rolls, among the three heating rolls.

It is desirable to control the temperature of each heating rolls individually. It it preferable to heat liquid crystal display device by the first heating roll to a temperature at which the liquid crystal material exhibits isotropic phase and then decrease the temperature by the second and third heating rolls to a temperature at which the liquid crystal material exhibits a liquid crystal phase so that the liquid crystal can be oriented. It is generally appropriate to control the temperature of the third heating roll about 5° to 10° C. lower than the temperature of the second heating roll. Although the spaces between the first and the second heating rolls and between the second and the third heating rolls are not particularly limited, it is effective to adjust the spaces to 3 mm or less for preventing the liquid crystal display device from cooling lower than the temperature of the next roll, whereby a high degree of orientation can be attained by merely moving the liquid crystal display device round the heating rolls with its surface closely contacted to that of the heating rolls.

The orientation state of liquid crystal material depends on the combination of liquid crystal material, orienting speed, bending force, etc.

With regard to orienting speed, it is preferable to make it variable so that a wide range of liquid crystal materials including low molecular weight liquid crystals, polymer liquid crystals, and mixtures thereof can be oriented by this method. For this purpose, it is preferable to control the orienting speed by using the winding roll as a driving roll for moving liquid crystal display device. A too large orienting speed may sometimes cause insufficient orientation or injury to substrates and on the other hand, if orienting speed is too small, though a sufficient orientation can be performed, the time required for the orientation may sometimes increase resulting in a decrease in practicability. If the orienting speed is adjusted to a speed identical with those of the steps of producing the liquid crystal display device, for example the step of applying and drying liquid crystal material, lamination step, or the like, a continuous process of producing liquid crystal display device at a high speed will become easy to practice efficiently, resulting in an extreme improvement of mass-productivity.

Next, a concrete description will be presented with regard to each roll, which is fundamentally similar to those of the other embodiments described above.

It is preferable to control the temperatures of the heating rolls 201 to 206 individually to desired temperatures ranging from 40° to 180° C.

With regard to the shapes of the heating rolls, the preferred diameter is generally 10 to 500 mm, and the preferred roll length, which is not particularly limited, is generally 10 to 2000 mm as measured as the effective length.

The materials of the heating rolls may be any of metals, ceramics, and rubbers, and the preferred are those having even surfaces and small temperature distributions. The second heating roll is preferably made of rubber for the purpose of preventing slip between the roll and the liquid crystal display device.

With regard to the rotating speed of the heating rolls, it is preferable to make it variable within the range of 0 to 50 m/min. as measured as the linear velocity of the heating rolls. The particularly preferred range is 0.2 to 20 m/min. It is preferable to control the rotating speed by using the winding roll as a driving roll.

With regard to the arrangement of the heating rolls, it is generally preferable to adjust the spaces between the first and second heating rolls and between the second and third heating rolls to 0.1 to 20 mm. The particularly preferred space is 0.5 to 5 mm. It is preferable to construct the first and third heating rolls 101 and 103 so that they can be move round the second heating roll 102 to the either side at a desired angle with maximum of about 45°, maintaining the distance to the second heating roll unchanged, with the proviso that the angles between the first and second heating rolls and between the second and third heating rolls are considered to be 0° when the axes of the three rolls run parallel with each other in one plane.

With regard to the shapes of the support roll 204 and the guide roll 205, the preferred diameter is generally 10 to 500 mm, and the preferred roll length, which is not particularly limited, is generally 10 to 2000 mm as measured as the effective length.

There is no particular limit in the materials of the support roll 204 and the guide roll 205, and these rolls may be of a construction in which they can be used as supplemental heating means.

With regard to the shapes of the supply roll 206 and the winding roll 207, the preferred diameter is generally 50 to 300 mm, and the preferred roll length (effective length) is generally 10 to 1000 mm.

It is preferable to make the winding speed variable in the range of 0 to 50 m/min., and the particularly preferred winding speed is 0.2 to 20 m/min. It is desirable to control the orienting speed by varying the winding speed.

It is further preferable to equip these rolls with electromagnetic brakes and tension controllers.

While the the above description centers on the subjects of the above description are apparatuses using three heating rolls, it is also possible to use one, two or more than 3 heating rolls. The number of heating rolls may be properly selected depending on conditions of other elements including the liquid crystal material, orienting speed, bending force, etc.

As apparent from the above description, the orientation apparatus of the present invention is simple in construction and is capable of orienting efficiently various kinds of liquid crystal optical devices to a high degree by a simple operation.

In order to more fully and clearly illustrate the present invention, the following examples are presented. It is intended that the examples be considered as illustrative rather than limiting the invention disclosed and claimed herein.

EXAMPLES 1 TO 24

Example 1

A flexible substrate bearing electrode layer is produced by using a film of a transparent polyethersulfone (PES) of about 100 μm in thickness as a flexible substrate and layering an ITO, which is a transparent conductive layer, of about 700 Å in thickness on one surface of the PES film. On the electrode surface of the obtained substrate was applied a ferroelectric polymer liquid crystal having the repeating unit represented by the following formula and the following properties and exhibiting isotropic phase by using a bar coater to form a layer of of about 2.5 μm in thickness after heating the ferroelectric polymer liquid crystal to 100° C.

At this stage, the liquid crystal molecules are randomly oriented.

Subsequently, after heating the liquid crystal optical device thus obtained by a heating apparatus 23 to 80° C. as shown in FIG. 7, the liquid crystal optical device was continuously subjected to bending treatment using a group of rolls consisting of three free rotation rolls of 30 mm in diameter which were maintained to the atmospheric temperatures shown in Table 1 and were arranged with the distance between the centers adjusted to 40 mm.

Five experiments similar to the above experiment were conducted to investigate the effects of atmospheric temperature and moving speed on degree of orientation. The results are shown in Table 1.

The results shown in Table 1 show that sufficient orientation can be attained by the above-described, simple method and that no exact adjustment of condition is required in bending treatment.

The value of the degree of orientation A shown in Table 1 was obtained according to the general measuring method commonly known.

That is, each of the liquid crystal optical devices subjected to the above bending treatment was arranged between and in parallel to two polarizers having polarizing axes meeting at right angles to construct a liquid crystal device. Then, while white light from a halogen lamp was radiated to the liquid crystal device, the liquid crystal device was rotated round the spot of the light and, at the same time, the variation in the strength of transmitted right was measured. The degree of orientation A means the ratio of the maximum strength ($I_{max}$) to the minimum strength ($I_{min}$).

TABLE 1

| T (°C.) | Phase of liquid crystal | Moving speed | Degree of orientation A |
|---|---|---|---|
| 20 | SmC* | 2 cm/sec. | 30 |
| 40 | SmA | 2 cm/sec. | 110 |
| 60 | SmA | 2 cm/sec. | 200 |
| 72 | SmA + Iso | 2 cm/sec. | 180 |
| 72 | SmA + Iso | 4 cm/sec. | 190 |

Example 2

A biaxially oriented PET (polyethyleneterephthalate) of 125 μm in thickness bearing ITO (thickness of ITO: about 1000 Å) was used as flexible substrate bearing electrode layer, and the following polyoxirane-based ferroelectric polymer liquid crystal was applied on the substrate by the method shown in FIG. 1.

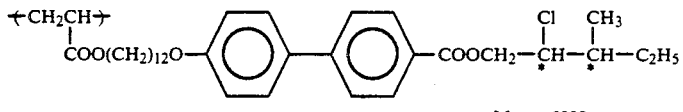

Mn = 5000

Phase transition behavior

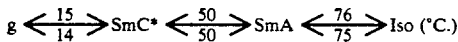

(g: glass state, SmC*: chiral smectic C phase, SmA: smectic A phase, Iso: isotropic phase)

Subsequently, a liquid crystal device of 10 cm in width and 30 cm in length was produced by using a film of PES of about 100 μm in thickness as the opposite substrate and laminating the substrate on the surface of the above-described application film of the above ferroelectric polymer liquid crystal.

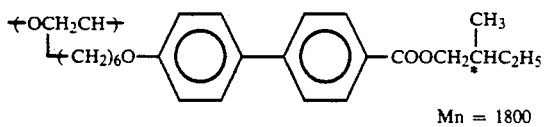

Phase transition behavior

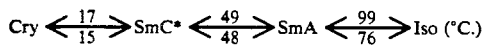

(Cry: crystal phase)

That is, a solution of the liquid crystal dissolved in a solvent (dichloromethane) to 10% by weight was applied on the substrate with a roll coater as shown in FIG. 1 to a thickness of about 15 μm, and then the solvent was evaporated to form a film of liquid crystal yet to be oriented that had a thickness of 1.5 μm.

Subsequently, after an opposite substrate made of the same biaxially oriented PET which bearing an ITO and having a thickness of 125 μm was laminated on the above film of liquid crystal, orientation by bending treatment was conducted by continuously moving the resulting laminate through two free rotation rolls (diameter: 20 mm, distance between centers: 40 mm) using the method shown in FIG. 6. At the time, the liquid crystal optical device yet to be oriented was previously heated to a temperature $T_1$ by a heating apparatus 23 and then sequentially cooled to a temperatures $T_2$ and $T_3$ while being subjected to bending treatment by the two free rotation rolls 18 and 19.

When the procedure described above was conducted under the condition, $T_1 = 105°$ C., $T_2 = 70°$ C., $T_3 = 25°$ C., and supply speed = 50 cm/sec., the degree of orientation A after cooling to 25° C. was about 160. Further, the degree of orientation A ranged between 150 and 170 over the width of the substrate of 15 cm, showing that the orientation procedure was well and uniformly performed.

Furthermore, because of the relatively high supply speed of 50 cm/sec., the above method is suitable for mass-production, and it could be continuously conducted together with the step of applying liquid crystal and lamination step, simultaneously.

Example 3

The procedure of Example 2 was repeated with the exception that a low molecular weight liquid crystal, DOBAMBC (p-decyloxybenzilidene-p'-amino-2-methylbutyl sinnamate):

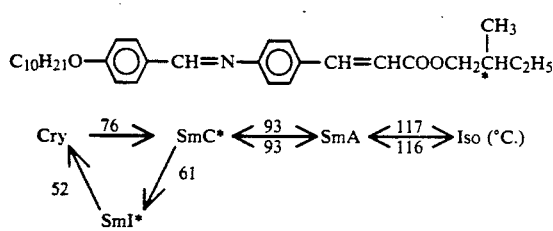

(SmI*: chiral smectic I phase), was supported between the same two PES substrates bearing ITO film as those used in Example 1 to produce a liquid crystal device yet to be oriented that had a width of 20 cm, a length of 150 cm, and a thickness of 3 μm, and the obtained liquid crystal device yet to be oriented was subjected to the same orientation treatment as that conducted in Example 2. When a condition of $T_1 = 120°$ C., $T_2 = 100°$ C., $T_3 = 80°$ C., and supply speed: 4 cm/sec. was employed, the degree of orientation A measured immediately after moving out from the group of cooling rolls (about 75° C.) was about 70. The uniformity of orientation was such that the degree of orientation A ranged from 55 to 80 over the width of the film of 20 cm, showing practically sufficient uniformity.

As apparent from the above results, it was confirmed that the orientation method of the present invention is an excellent orientation method for both of low molecular weight ferroelectric liquid crystals and polymer ferroelectric liquid crystals. Further, it was also confirmed that the method of the present invention is extremely effective for, particularly, ferroelectric polymer liquid crystals having a wide range of temperature wherein the liquid crystals exhibit a mixed liquid crystal phase, such as a mixed liquid crystal phase of isotropic phase and a smectic phase.

Example 4

A 10% dichloromethane solution of a mixture containing the low molecular weight ferroelectric liquid crystal shown below, an epoxy resin (MG 150 produced by Nippon Pernox Co., Ltd.) as main agent, and a hardening agent in a weight ratio of 3:1:1 was applied as a layer on a substrate of biaxially oriented polyester film (CELEC K-US produced by Daicel Chemical Industries, Ltd.) bearing ITO by applying the solution using a micro-gravure coater. The original film of substrate had a width of 210 mm, a length of 5 m, and a thickness of 100 μm. After evaporating the solvent, the thickness of the liquid crystal-epoxy resin mixture was measured to be about 3 μm. On the obtained substrate, the same substrate as above-described substrate having nothing applied on it was laminated as the opposite substrate by two pressure rolls of 80 mm in diameter and 40 cm in length which were heated to 40° C. and applied with an air pressure of 2 kg/cm², to produce a device yet to be oriented. When optically principal axis of the original film of substrate was measured as the direction of the film in which the strength of a transmitted light was minimized while rotating the film between crossed polarizers, the optically principal axis of the original substrate was measured to have a direction making an angle of 32° with the MD direction.

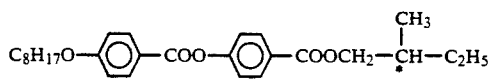

Phase transition behavior

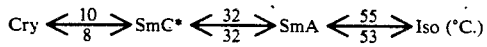

Because each of the substrates had an orienting direction making an angle with the MD direction (the longitudinal direction of a film), the device obtained by lamination had principal axes in two directions.

Orientation treatment was performed by using the method shown in FIG. 8 and by conducting bending treatment in a direction making the tilt angle of the liquid crystal, $\theta = 16°$ (25° C.), with one main axis.

When the bending treatment was conducted by the method shown in FIG. 8 under the condition of $T_1 = 60°$ C., $T_2 = 50°$ C., $T_3 = 30°$ C., $a = 60°$, and line speed: 3 m/min., the contrast ratio was measured to be 36 at 25° C. between crossed polarizers and at ±5 V of applied voltages. Perhaps, the high contrast ratio obtained may be attributable to the fact that the angle made by lamination between the two principal axes was as large as 64° whereby decreasing the effect of the main axis other than that described above in the procedure of orientation treatment.

When bending treatment was conducted as an comparative example under the condition of "a" (shown in FIG. 8)=0°, a contrast ratio of 2 or more could not be attained no matter how the angle between the two polarizers was varied.

Example 5

A 20% by weight dichloromethane solution containing a ferroelectric liquid crystal:

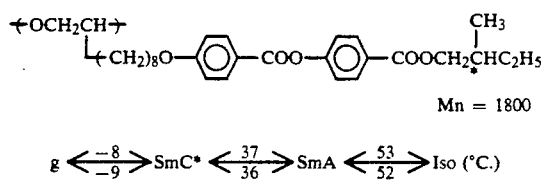

was applied using a direct-gravure coater on a substrate of uniaxially oriented PET film (CELEK KT-LC produced by Daicel Chemical Industries Co., Ltd., width: 30 cm, length: 10 m, thickness: 125 μm) bearing ITO to form a liquid crystal layer of about 2 μm in thickness. Subsequently, on the resulting substrate, the same substrate as the original substrate was laminated using the same pressure roll as that used in Example 1. Because the angle between the direction of the optically principal axis of the substrate and the MD direction was not more than 5°, bending was conducted by the method shown in FIG. 8 in the direction making the tilt angle of the liquid crystal ($\theta=25°$, 25° C.) with the optically principal dirction. The bending treatment was conducted by the method shown in FIG. 8 under the condition of $T_1=60°$ C., $T_2=48°$ C., $T_3=25°$ C., a=25°, and line speed: 4 m/min.

When contrast ratio was measured by supporting a device cut out into a size of 30 cm × 30 cm between two polarizing plates having their respective polarizing axes in the MD direction of the film and in the direction intersecting perpendicularly to the MD direction, the contrast ratio was measured to be 75 at 25° C. and at applied voltages of ±10 V, which value shows the extremely high efficiency of the device produced in this Example.

When the "a" shown in FIG. 8 was adjusted as comparative examples to 5° and 10°, contrast was measured to be 18 and 27, respectively.

Example 6

A 10% by weight chloroform solution of a mixture containing the ferroelectric polymer liquid crystal used in Example 5 and the epoxy resin (main agent) and the hardening agent both used in Example 4 in a weight ratio of 4:1:1 was applied on a substrate of a PES film (SUMILITE FST produced by Sumitomo Bakelite Co., Ltd., width: 15 cm, length: 80 cm, thickness: 100 μm) by screen-printing method, and the solvent was then evaporated to obtain a layered film of about 5 μm in thickness. After the same substrate as the original substrate described above was laminated on the layered film by using the same pressure roll as that used in Example 4, the obtained device was subjected to bending treatment by the method shown in FIG.

The orientation treatment by the above bending treatment shown in FIG. 15 was conducted under the condition of $T_1=60°$ C., $T_2=48°$ C., $T_3=25°$ C., line speed: 5 m/min., and a=0° and 25°.

The contrast ratio obtained at 25° C. and at ±10 V was 66 when a=0°, and was 68 when a=25°, which are approximately equal to each other. The fact shows that a sufficiently high orientation can be obtained even under the condition of a≠0°. Further, the polarizing plate used in construction of device was used efficiently without wasting any portion by equalizing "a" to the tilt angle.

EXAMPLES 7 TO 12

Production of Liquid Crystal Optical Device to be Supplied (1) Low molecular weight ferroelectric liquid crystal I

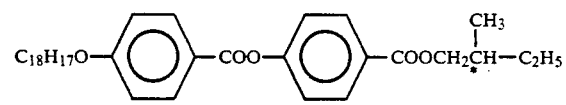

Phase transition behavior

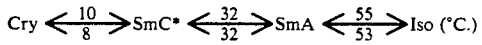

(2) Low molecular weight ferroelectric liquid crystal II

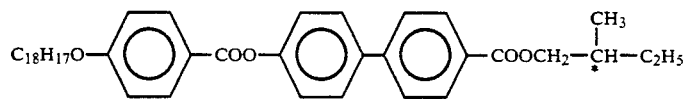

Phase transition behavior

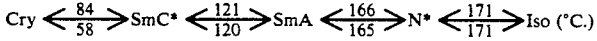

(N*: chiral nematic phase)

(3) Ferroeletric polymer liquid crystal

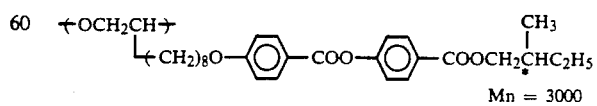

Phase transition behavior

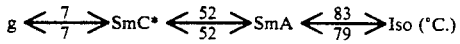

Two mixtures, $A_1$ and $A_2$, containing a mixture liquid crystal of the above (1) and (2) (molar ratio=1:3) and the ferroelectric polymer liquid crystal (3) in molar ratios of ((1)+(2)):(3)=9:1 and 4:6 respectively was prepared. The phase transition behavior of the obtained mixtures was examined, and the results are shown as follows.

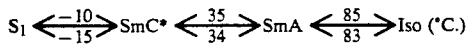 $A_1$ ($S_1$: an unidentified phase showing glass-like state under microscopic observation. At least, the mixture did not crystallize till the temperature was lowered to $-20°$ C.)

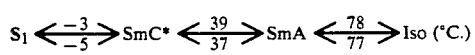 $A_2$

The presence of the ferroelectric polymer liquid crystal (3) in $A_1$ and $A_2$ stabilized the chiral smectic C phase around room temperature, resulting in that destruction of the orientation state due to crystalization hardly occurred even at low temperatures.

As thermoplastic resin, the following three were used.

$B_1$: Polychlorostyrene
Mw = 50000, Tg = 90° C.

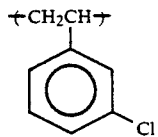

$B_2$: Poly-2-vinylpyridine
Mw = 40000, Tg = 104° C.

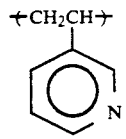

$B_3$: Polycarbonate
Mw = 20000, Tg = 150° C.

-continued

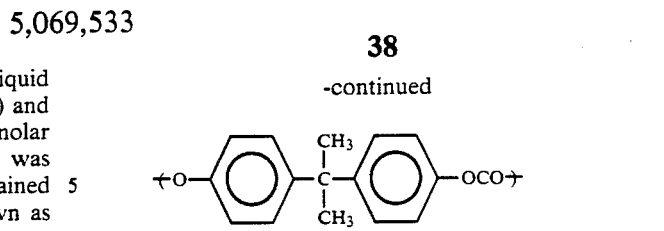

In order to examine the effect produced by difference in the kind of polymer, the ratio of the amounts of liquid crystal component used and thermoplastic resin used were uniformalized to 2:1 in weight ratio. The obtained mixtures were respectively dissolved in dichloromethane to form 10% by weight solutions.

Regarding to flexible substrate, PES (polyethersulfone) substrates (width 150 mm, thickness: 125 μm) bearing their respective ITO were used to be provided to both sides of each liquid crystal film.

After a step of applying liquid crystal composition on substrate was conducted by continuously applying each of the above-described solution on a rolled substrate using a micro-gravure coater, the obtained substrate was laminated with an opposite substrate by passing them together through between two pressure rolls. After the lamination, the ferroelectric liquid crystal composition had a thickness of about 5 μm.

ORIENTATION TREATMENT

Each of the samples produced above was used as the liquid crystal optical device 126a and was oriented by subjecting it to bending treatment using the apparatus and the corresponding orientation method shown in Table 2 by the number of figure, under the condition shown in Table 2. Because PES was used as flexible substrate, the panel angle a was adjusted to 0°. Each of the samples subjected to orientation treatment had been previously cut from the obtained sheet of 15 cm in width into a form of cut sheet having a length of 20 cm.

The degree of orientation of each of the oriented samples was evaluated by measuring contrast ratio. The results are shown in Table 2.

Measurement of contrast ratio was conducted between crossed polarizers and under the condition of the applied voltages of ±10 V.

TABLE 2

|  | Blending ratio 2/1 | $T_1$(°C.) Heating roll 101 | $T_2$(°C.) Heating roll 102 | $T_3$(°C.) Heating roll 103 | Orientation speed (m/min) | $\theta_1$ (°) | $\theta_2$ (°) | Contrast ratio | Used apparatus, etc. |
|---|---|---|---|---|---|---|---|---|---|
| Example 7 | $A_1/B_1$ | 92 | 70 | 40 | 10 | −20 | +10 | 60 | FIG. 11 |
| Example 8 | $A_1/B_2$ | 100 | 70 | 30 | 5 | 0 | 0 | 61 | FIG. 13 |
| Example 9 | $A_1/B_3$ | 108 | 80 | 60 | 4 | +40 | −35 | 55 | FIG. 11 |
| Example 10 | $A_2/B_1$ | 90 | 70 | 30 | 8 | −40 | +35 | 75 | FIG. 13 |
| Example 11 | $A_2/B_2$ | 98 | 70 | 50 | 6 | 0 | 0 | 72 | FIG. 11 |
| Example 12 | $A_2/B_3$ | 105 | 80 | 60 | 2 | +30 | −30 | 48 | FIG. 11 |

Each of the above contrast ratio was measured at the applied voltage of ±10 V.
θ: moving angle of roll Example 13

Production of liquid crystal device to be supplied

A low molecular weight ferroelectric liquid crystal:

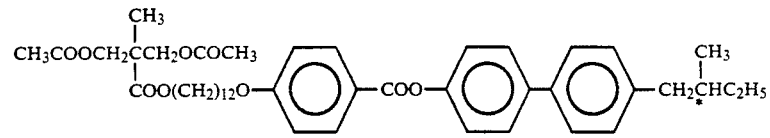

Phase transition behavior

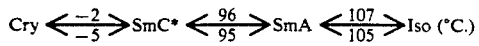
$$Cry \xrightleftharpoons[-5]{-2} SmC^* \xrightleftharpoons[95]{96} SmA \xrightleftharpoons[105]{107} Iso \ (°C.)$$

and the ferrelectric polymer liquid crystal (3) used in Examples 7 to 12 were mixed in a molar ratio of 7:3 to obtain the mixture liquid crystal exhibiting the following phase transition behavior.

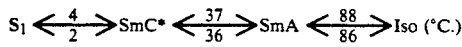
$$S_1 \xrightleftharpoons[2]{4} SmC^* \xrightleftharpoons[36]{37} SmA \xrightleftharpoons[86]{88} Iso \ (°C.)$$

($S_1$: an unidentified phase. At least, the mixture liquid crystal did not crystallize till the temperature was cooled to $-30°$ C.)

A mixture containing the mixed liquid crystal and polyvinylchloride in a weight ratio of 3:2 was dissolved in tetrahydrofuran (THF) to form a 15% by weight solution. The obtained solution was applied on a substrate of uniaxially oriented PET (thickness: 100 μm, width: 200 mm) bearing ITO electrode by screen-printing method and after evaporation of the solvent, a composite film of about 6 μm in thickness was obtained.

Orientation treatment

The sample obtained above was used as the liquid crystal optical device 126a and was subjected to orientation treatment by the orientation apparatus and method shown in FIG. 11 under the condition of $T_1=90°$ C., $T_2=78°$ C., $T_3=45°$ C., orientation speed: 2 m/min., $\theta_1=0°$, and $\theta_2=0°$ (with the proviso that $T_1$, $T_2$, $T_3$, $\theta_1$, and $\theta_2$ are as defined in Table 2.).

Because a uniaxially oriented PET was used as substrate, the panel angle a was adjusted to 16°, which is equal to tilt angle.

The sample subjected to orientation had been previously cut into a cut-sheet form having the same size as those of Examples 7 to 12. Contrast ratio of the oriented sample was measured by the same procedure as that of Example 7 to be as high as 60.

Example 14

A 20% by weight dichloromethane solution of the ferrelectric polymer liquid crystal:

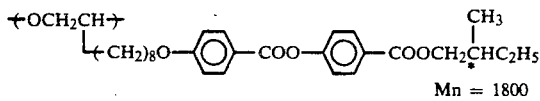
$Mn = 1800$

Phase transition behavior

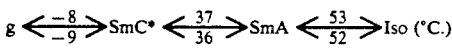
$$g \xrightleftharpoons[-9]{-8} SmC^* \xrightleftharpoons[36]{37} SmA \xrightleftharpoons[52]{53} Iso \ (°C.)$$

was applied on a PES film (SUMILITE FST produced by Sumitomo Bakelite Co., Ltd., width: 15 cm, length: 10 m, thickness: 100 μm) bearing ITO electrode using a gravure coater, and then the solvent was evaporated to obtain a liquid crystal layer of about 2 μm in thickness. On the liquid crystal layer, the same PES film was laminated to produce a liquid crystal optical device to be supplied.

The obtained, lengthy liquid crystal optical device of 15 cm in width and 10 m in length was continuously subjected to orientation treatment by the orientation apparatus and method shown in FIG. 14 under the condition of $T_1=60°$ C., $T_2=48°$ C., $T_3=38°$ C., orientation speed: 2 m/min., $\theta_1=0°$, $\theta_2=0°$, and panel angle $a=0°$. Contrast of the obtained, oriented sample was measured by the same method as that employed in Example 7 to be as high as 72.

Example 15

As lengthy substrate bearing transparent electrode, PES (polyethersulfone) (SUMILITE FST produced by Sumitomo Bakelite Co., Ltd.) of 100 μm in thickness and 15 cm in width coated on its one surface with an ITO of 0.2 μm in thickness, which is a transparent, conductive film, was used.

As the liquid crystal material to be supported between two substrates bearing their respective, transparent electrodes, a mixture which contains a ferroelectric polymer liquid crystal having the following repeating unit and the following property and an epoxy-based adhesive (KER 1001 produced by Koei Kagaku Co., Ltd., weight ratio of main agent to hardening agent: 4:1) in a weight ratio of 3:1 was used.

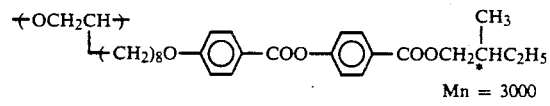
$Mn = 3000$

Phase transition behavior

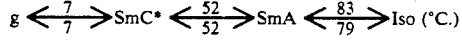
$$g \xrightleftharpoons[7]{7} SmC^* \xrightleftharpoons[52]{52} SmA \xrightleftharpoons[79]{83} Iso \ (°C.)$$

A solution of the liquid crystal material dissolved in a solvent, 1,1,1-trichloroethane to a concentration of the liquid crystal material of 10% by weight was applied on ITO film coating one substrate using a micro gravure roll, and the solvent was then evaporated out. Further, the same substrate as that described above was laminated on the obtained substrate to produce a liquid crystal device having a width of 15 cm, a length of 2 m, and a thickness of liquid crystal layer of 2.5 μm.

The obtained device was oriented by using the orientation apparatus of the present invention under the following condition.

As shown in FIG. 19, among the three heating rolls used, the first and second rolls were heated. The first heating roll used had a diameter of 80 mm and a roll length of 300 mm, and its material was a cold finished steel bar the surface of which had been hard-chrome plated. Further, the second heating roll used had a diameter of 80 mm and a roll length of 300 mm, and its material was a cold finished steel bar round which silicone rubber had been wound. The first heating roll and the second heating roll were spaced by from each other 2.0 mm. With regard to the orientation condition, the temperature of the first heating roll $T_1$ was adjusted to 86° C., the temperature of the second heating roll $T_2$ to 60° C., and the device supply speed, i.e. the orientation speed, to 10 m/min. Because two heating rolls were used for heating, the angle $\theta_1$ between the first roll and the second heating roll was adjusted to 0°, and also the angle $\theta_2$ between the second roll and the third roll was adjusted to 0°.

After conducting orientation under the above-described condition, the degree of orientation was evaluated by measuring contrast ratio (CR) at applied voltages of ±10 V, and the contrast ratio was measured to be 43.

When contrast ratio was measured at four points distributed with a space of 3 cm between the points in the width direction of the device having a width of 15 cm in order to examine the uniformity of contrast ratio, the contrast ratios at the four points were measured to be respectively 47, 44, 42, and 39, and the average was 43. When it was measured at ten points uniformly distributed in the direction of length of 2 m, all of the measured contrast ratios were 40 or more, showing an orientation having a good uniformity.

Example 16

The same PES substrate as that used in Example 15 was used with the proviso that the width was changed to 45 cm.

As liquid crystal material, a blend of ferroelectric polymer liquid crystals and ferroelectric low molecular weight liquid crystals was used. The structures of the above liquid crystals and the blending ratio (mol %) were as follows.

heating rolls. The first heating roll used had a diameter of 100 mm and a roll length of 800 mm, and its material was a cold finished steel bar the surface of which had been hard-chrome plated. The second heating roll used had a diameter of 100 mm and a roll length of 800 mm, and its material was a cold finished steel bar round which a rubber had been wound. The third heating roll used had a diameter of 100 mm and a roll length of 800 mm, and its material was a cold finished steel bar round which a rubber had been wound. The first heating roll and the second heating roll were spaced from each other by 1.5 mm. The second heating roll and the third heating roll were spaced from each other by 2.0 mm. The orientation was conducted under the condition of orientation speed: 15 m/min., $T_1=88°$ C., $T_2=79°$ C., $T_3=70°$ C., $\theta_1=25°$ and $\theta_2=15°$. When contrast ratio was measured at applied voltages of ±10 V by the same procedure as that employed in Example 15, all contrast ratios were 68 or more, showing an orientation having a good uniformity.

Examples 17 to 20

The same liquid crystal device as that produced in Example 16 was subjected to orientation treatment using the same apparatus as that used in Example 16 with the proviso that the orientation condition was changed, and degree of orientation of the oriented de-

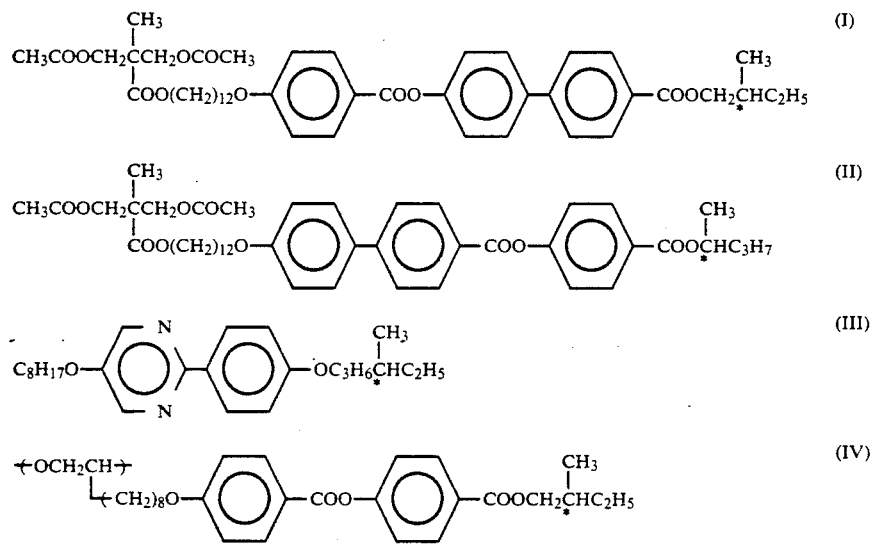

(I):(II):(III):(IV) = 45.6:30.4:4.0:20.0 (mol %)

Phase transition behavior

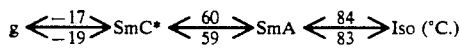

To the blend was further added the same adhesive as that used in Example 16 in the same ratio. Further, the obtained blend was dissolved to a concentration of liquid crystal material of 20% by weight with the same solvent used in Example 15. The obtained solution was applied on the ITO coating a substrate by kiss-roll coating method with a gravure roll and was then dried. Subsequently, the same substrate was laminated on the above obtained substrate to produce a liquid crystal device having a width of 15 cm, a length of 2.5 m, and a thickness of liquid crystal film of 2 μm.

The obtained liquid crystal device was continuously oriented by the method shown in FIG. 18 using three vice was then measured. The orientation condition and the obtained contrast ratio were shown in Table 3. The obtained results were good.

TABLE 3

| | $T_1$ (°C.) | $T_2$ (°C.) | $T_3$ (°C.) | $\theta_1$ (°) | $\theta_2$ (°) | Contrast ratio |
|---|---|---|---|---|---|---|
| Example 17 | 90 | 80 | 75 | 0 | 0 | 72 |
| Example 18 | 85 | 80 | 75 | −35 | +40 | 68 |
| Example 19 | 90 | 80 | 70 | −15 | +10 | 70 |

TABLE 3-continued

| | $T_1$ (°C.) | $T_2$ (°C.) | $T_3$ (°C.) | $\theta_1$ (°) | $\theta_2$ (°) | Contrast ratio |
|---|---|---|---|---|---|---|
| Example 20 | 85 | 75 | 70 | +40 | −45 | 77 |

Example 21

A PES substrate (thickness: 100 μm, width: 300 mm, length: 10 m, rolled type) bearing ITO was used as flexible substrate bearing electrode layer, and a 8% by weight solution of the following liquid crystal composition dissolved in dichloromethane was applied on the electrode surface of the substrate.
Liquid crystal material:
Ferroelectric polymer liquid crystal A

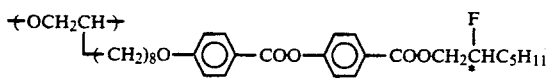

$Mn = 3000$

Ferroelectric low molecular weight liquid crystal B

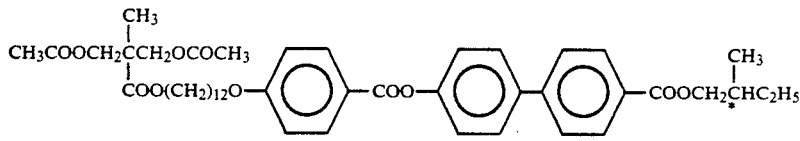

A:B=30:70 (mol %).

Phase transition behavior

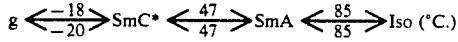

Adhesive:
CEMEDINE HIGH-SUPER (epoxy-based adhesive produced by Cemedine Co., Ltd.)
  main agent: hardening agent=1:1 (vol %)
  Liquid crystal material: Adhesive=80:20 (weight part)

After evaporating the solvent, an opposite PES substrate bearing ITO of the same kind as that described above was laminated on the liquid crystal layer using a pair of pressing rolls (One roll is a chrome-gilt iron roll, and the other is made of rubber. Both have a diameter of 80 mm and a length of 500 mm.) to produce a liquid crystal optical device. The obtained device had a liquid crystal layer of a thickness of about 3 μm.

Directly after the lamination, the liquid crystal optical device was oriented by a bending treatment using a group of rolls consisting of three free rotation rolls 302, 303, and 304 shown in FIG. 20 (Every roll is a chrome-gilt iron roll having a diameter of 80 mm.). The orientation by bending treatment was conducted while heating the liquid crystal optical device rapidly to the isotropic phase temperature by the first roll 302 and then cooling it to the SmA phase temperature by the second and third rolls 303 and 304 successively.

The above procedure was conducted under the conditions that the spaces between the first roll 302 and the second roll 303 and between the second roll 303 and the third roll 304 were 1 mm, the surface temperatures of the three rolls were respectively adjusted to $T_1=90°$ C., $T_2=77°$ C., and $T_3=75°$ C., and the supply speed of the liquid crystal optical device was adjusted to v=2 m/min.

The adhesive was completely cured about five minutes after the above orientation treatment. The liquid crystal optical device was then cut off to a length of 30 cm, and the obtained cut-sheet type of crystal optical device was sandwiched between two polarizing plates having polarizing axes perpendicularly intersecting each other. When the contrast ratio was measured by applying d.c. voltages of ±5 V between the upper and lower electrode layers, the greatest value of 110 was obtained by arranging the liquid crystal optical device so that the orientation direction and one of the polarizing axes approximately make an angle of 22.5°. After measuring the contrast ratio at various measuring points, it was proved that a high degree of orientation, i.e. contrast ratios of 100 or more, was attained over the whole device.

Example 22

In the same manner as that described in Example 21, the same liquid crystal composition as that used in Example 21 was applied on a uniaxially oriented PET substrate bearing ITO and having an optical main axis in the longitudinal direction, and the same opposite, uniaxially oriented PET substrate bearing ITO was laminated on the obtained liquid crystal layer, to obtain a liquid crystal optical device. The obtained liquid crystal optical device was then cut into pieces of 30 cm in length, and the obtained cut sheets were subjected to orientation treatment one by one by using an apparatus shown in FIG. 21 which consists of three free rotation rolls 302, 303, and 304. While the orientation treatment, the liquid crystal optical device 319 yet to be oriented was supported between two supporting belts 321, and was heated to a temperature $T_1$ by the first roll 302 which serves as a heating roll and then cooled to a temperature $T_2$ and successively to $T_3$ by the second and third rolls 303 and 304 which serve as a cooling roll, during bending the device 319. At the time, as shown in FIG. 21, the free rotation roll 302 had been shifted to the plus direction by an angle $\phi$ round the rotating axis of the roll 303, and the free rotation roll 304 had been shifted to the minus direction by a roll-arrangement angle $\phi$. Also, the liquid crystal optical devices 319 yet to be oriented were arranged on the supporting belt 321 so as to tilt by a device-arrangement angle $\theta$ as shown in FIG. 22.

In the above procedure, the support rolls 318 used were free rotation rolls made of chrome-gilt iron and were 40 mm in diameter and 500 mm in width, the free rotation rolls 302 and 303 used were free rotation rolls made of chrome-gilt iron and were 80 mm in diameter and 500 mm in width, and the free rotation roll 304 used was of the same kind as that of the free rotation rolls 302 and 303 and was attached to a driving motor. The supporting belts 321 used were polycarbonates sheets of 75 μm in thickness and 480 mm in width. The spaces between the free rotation rolls 302 and 303 and between the free rotation rolls 303 and 304 were adjusted to 1 mm, the roll-arrangement angle $\phi$ was adjusted to 45°, and the device-arrangement angle θ was adjusted to 22.5°. After the orientation treatment was conducted under the conditions of the supply speed v=3 m/min and the surface temperatures of the free rotation rolls $T_1=93°$ C., $T_2=78°$ C., and $T_3=50°$ C., the contrast ratio was measured to be as good as 135 at applied voltages of ±5 V when the contrast ratio was measured with the oriented device arranged between crossed polarizers so that the optical main axis of the PET substrate and the polarizing axes of the polarizing plates are at right angles and are parallel to each other.

Example 23

A cut-sheet of liquid crystal optical device of 30 cm square was cut from the liquid crystal optical device 319 yet to be oriented that had bee produced in Example 21, and the whole cut-sheet device was then subjected to a bending treatment by forcing it to vibrate (1.5 Hz, amplitude: 3 cm) as shown in FIG. 23 with one side of the cut-sheet device secured by a jig 322. The cut-sheet device was heated prior to the bending treatment to a temperature at which the liquid crystal exhibits isotropic phase by exposing the device to hot-air of about 120° C. using a blower equipped with a heater, and subsequently the device was rapidly cooled in an atmosphere of room temperature while vibrating it. Immediately after beginning the rapid cooling, the liquid crystal transferred to SmA phase causing clouding, but the cloudiness was cleared by the time it was cooled to room temperature by several vibrations. The contrast ratio was measured using cross-Nicols to be about 70 at the side secured with the jig and about 140 at the opposite side. Further, even at the center part, the contrast ratio was measured to be 120 or more, and these facts proved that sufficient orientation was attained over the whole device.

Example 24

A PC (polycarbonate) substrate (thickness: 100 μm, width: 20 cm, length: 20 m, rolled type) bearing ITO was used as flexible substrate bearing electrode layer, and a 10% by weight solution of the following liquid crystal composition dissolved in dichloromethane was applied on the electrode surface of the substrate using a direct gravure coater. After drying, the obtained substrate had a liquid crystal layer of 2.5 μm on the electrode surface.

Liquid crystal material: ferroelectric polymer liquid crystal

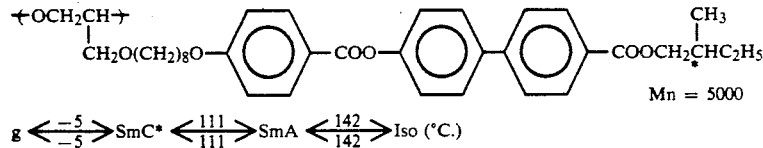

$g \underset{-5}{\overset{-5}{\rightleftarrows}} SmC^* \underset{111}{\overset{111}{\rightleftarrows}} SmA \underset{142}{\overset{142}{\rightleftarrows}} Iso$ (°C.)

Adhesive: CEROMEC SUPER Y 862-1 produced by Cemedine Co., Ltd.

Liquid crystal material: Adhesive=70:30 (weight part)

Subsequently, the same PC substrate bearing ITO as that described above was laminated on the liquid crystal layer to obtain a liquid crystal optical device. By employing the method shown in FIG. 24, the obtained liquid crystal optical device 301 was subjected to orientation treatment by moving it through a heating furnace 307 of a temperature $T_1$ and a group of rolls consisting of two free rotation rolls 302 and 303, and the adhesive was subsequently cured by irradiating UV light using a metal halide lamp 324 of 400 W.

The above procedure was conducted by using free rotation rolls 302 and 303 of chrome-gilt iron and of 100 mm in diameter and 30 cm in width, under the conditions of $T_1=150°$ C., $T_2=130°$ C., and the supply speed of the liquid crystal optical device 301 v=2.5 m/min.

The contrast ratio was measured at room temperature using crossed polarizers to be as good as 85 at applied d.c. voltages of ±5 V.

What is claimed is:

1. A method of orienting a liquid crystal in a liquid crystal optical device including a smectic liquid crystal and two flexible substrates which support a layer of the smectic liquid crystal therebetween and which carry on surfaces facing each other respective electrode layers, which method comprises orienting the smectic liquid crystal by bending the liquid crystal optical device, the bending of the device being within a radius of curvature of 5 to 1,000 mm.

2. The method as claimed in claim 1, wherein the liquid crystal optical device is bent in the course of continuous movement of the liquid crystal optical device along a curved path.

3. The method as claimed in claim 2, wherein the liquid crystal optical device is bent in the course of continuous movement of the liquid crystal optical device over at least one free rotation roll.

4. The method as claimed in claim 3, wherein the liquid crystal optical device is bent in the course of continuous movement of the liquid crystal optical device along a curved path between at least two free rotation rolls; one surface of the liquid crystal optical device being in contact with a cylindrical surface of one of the free rotational rolls having said radius of curvature and thereafter another surface of the liquid crystal optical device being contacted with a cylindrical surface of another free rotation roll having the radius of curvature so that the surfaces of the liquid crystal optical device are bent, respectively, along a cylindrical surface of each of the at least two free rotation rolls.

5. The method as claimed in claim 1, wherein the orientation of the smectic liquid crystal by bending is conducted within the range of temperatures at which the smectic liquid crystal exhibits smectic A phase.

6. The method as claimed in claim 1, wherein the orientation of the smectic liquid crystal by subjecting the liquid crystal optical device to a bending treatment is conducted within the range of temperatures at which the smectic liquid crystal exhibits a mixed phase of isotropic phase and smectic A phase.

7. The method as claimed in claim 1, wherein the orientation of the smectic liquid crystal by bending is conducted within the range of temperatures at which the smectic liquid crystal exhibits a mixed phase of isotropic phase and chiral smectic C phase.

8. The method as claimed in claim 1, wherein the orientation of the smectic liquid crystal by bending is conducted during cooling the smectic liquid crystal from a temperature at which the smectic liquid crystal exhibits isotropic phase to a temperature at which the smectic liquid crystal exhibits smectic A phase.

9. The method as claimed in claim 1, wherein the smectic liquid crystal has a ferroelectric liquid crystal phase, and the bending of the liquid crystal optical device is conducted with the bending direction of the bending being adjusted so that the bending direction and the optically principal axis (orientation direction) of at least one of the substrates approximately make, on the plane of the substrate, the tilt angle $\theta$ of the ferroelectric liquid crystal phase of the smectic liquid crystal.

10. The method as claimed in claim 1, wherein the orientation of the smectic liquid crystal by bending the liquid crystal optical device is conducted within the range of temperatures at which the smectic liquid crystal exhibits chiral smectic C phase.

11. The method as claimed in claim 1, wherein the orientation of the smectic liquid crystal by bending the liquid crystal optical device is conducted during cooling the smectic liquid crystal from a temperature at which the smectic liquid crystal exhibits isotropic phase to a temperature at which the smectic liquid crystal exhibits chiral smectic C phase.

12. The method as claimed in claim 1, wherein the smectic liquid crystal is a smectic liquid crystal having a ferroelectric liquid crystal phase, and the bending of the liquid crystal optical device is conducted with the bending direction of the bending treatment adjusted so that the bending direction and the optically principal axis (orientation direction) of at least one of the substrates approximately make, on the plane of the substrate, $90° - \theta$, $\theta$ being the tilt angle of the ferroelectric liquid crystal phase of the smectic liquid crystal.

13. The method as claimed in claim 1, wherein the smectic liquid crystal is a smectic liquid crystal having a ferroelectric liquid crystal phase, and the bending of the liquid crystal optical device is conducted with the bending direction of the bending treatment adjusted so that the bending direction and the longitudinal direction of the substrates approximately make, on the planes of the substrates, the tilt angle $\theta$ of the ferroelectric liquid crystal phase of the smectic liquid crystal.

14. The method as claimed in claim 1, wherein the smectic liquid crystal is a smectic liquid crystal having a ferroelectric liquid crystal phase, and the bending of the liquid crystal optical device is conducted with the bending direction of the bending treatment adjusted so that the bending direction of the substrates approximately make, on the planes of the substrates, $90° - \theta$, $\theta$ being the tilt angle of the ferroelectric liquid crystal phase of the smectic liquid crystal.

15. A method of orienting a liquid crystal in a liquid crystal optical device including a smectic liquid crystal, and two flexible substrates which support a layer of the smectic liquid crystal therebetween, and which carry on surfaces facing each other respective electrode layers, which method comprises orienting the smectic liquid crystal by supporting the liquid crystal optical device on a supporting means including at least one supporting sheet and bending the supporting means supporting the liquid crystal optical device and the liquid crystala optical device in the course of continuous movement of the supporting means along a curved path, the bending of the supporting means and the supported liquid crystal optical device being within a radius of curvature of 5 to 1,000 mm.

16. The method as claimed in claim 15, wherein the orientation of the smectic liquid crystal by bending is performed by causing the one surface of the supporting means supporting the liquid crystal optical device to come into contact with a curved surface of at least one heating roll in the course of the continuous movement of the supporting means along said curved path.

17. The method as claimed in claim 15, wherein the orientation of the smectic liquid crystal by bending is performed by causing the supporting means supporting the liquid crystal optical device and the liquid crystal optical device to come alternately into contact with roll surfaces of at least two heating rolls in the course of continuous movement of the supporting means along a meandering path between said at least two heating rolls.

18. The method as claimed in claim 16 or claim 17, wherein the liquid crystal optical device is in the form of a laminated sheet cut-to-size.

19. The method as claimed in claim 15, wherein the liquid crystal optical device is supported between two supporting sheets which are moving for transferring the liquid crystal device, and the supporting sheets are bent together with the liquid crystal optical device supported between them by guiding the supporting sheets with the liquid crystal optical device supported therebetween around at least one heating roll, the heating roll having a cylindrical surface and a radius of 5 to 1,000 mm, so that one outer surface of the supporting sheets is in contact with the cylindrical surface of the heating roll, and continuously moving the supporting sheets so that the liquid crystal optical device is bent together with the supporting sheets along the cylindrical surface of the heating roll.

20. The method as claimed in claim 19, wherein the liquid crystal optical device is supported between two supporting sheets which are moving for transferring the liquid crystal optical device, and the supporting sheets are bent together with the liquid crystal optical device supported between the supporting sheets by guiding the supporting sheets with the liquid crystal optical device supported therebetween around at least two heating rolls, each of the heating rolls having a cylindrical surface and a radius of 5 to 1,000 mm, so that two outer surfaces of the supporting sheets alternately come in contact with the cylindrical surfaces of the heating rolls, and continuously moving the supporting sheets so that the liquid crystal optical device is bent at least twice together with the supporting sheets along the cylindrical surfaces of the heating rolls.

* * * * *

UNITED STATES PATENT AND TRADEMARK OFFICE
CERTIFICATE OF CORRECTION

PATENT NO. : 5,069,533

DATED : December 3, 1991

INVENTOR(S) : K. YUASA, et al

It is certified that error appears in the above-identified patent and that said Letters Patent is hereby corrected as shown below:

```
On the Title Page, left-hand column:

"[30]          Foreign Application Priority Data

Jun. 29, 1988  [JP]  Japan.................63-159510
   Aug. 24, 1988  [JP]  Japan.................63-208222
   Jan. 18, 1989  [JP]  Japan.................63-007704
   Mar.  9, 1989  [JP]  Japan.................63-055224 "

should read:

-- Jun. 29, 1988  [JP]  Japan.................63-159510
   Aug. 24, 1988  [JP]  Japan.................63-208222
   Jan. 18, 1989  [JP]  Japan..................1-007704
   Mar.  9, 1989  [JP]  Japan..................1-055224  --
```

Signed and Sealed this

Eleventh Day of May, 1993

Attest:

MICHAEL K. KIRK

*Attesting Officer*       *Acting Commissioner of Patents and Trademarks*